(12) United States Patent
Seo et al.

(10) Patent No.: US 7,561,780 B2
(45) Date of Patent: *Jul. 14, 2009

(54) TEXT SUBTITLE DECODER AND METHOD FOR DECODING TEXT SUBTITLE STREAMS

(75) Inventors: Kang Soo Seo, Anyang-si (KR); Byung Jin Kim, Seongnam-si (KR); Jea Yong Yoo, Seoul (KR)

(73) Assignee: LG Electronics, Inc., Seoul (KR)

( * ) Notice: Subject to any disclaimer, the term of this patent is extended or adjusted under 35 U.S.C. 154(b) by 421 days.

This patent is subject to a terminal disclaimer.

(21) Appl. No.: 11/013,379

(22) Filed: Dec. 17, 2004

(65) Prior Publication Data

US 2005/0196147 A1 Sep. 8, 2005

Related U.S. Application Data

(60) Provisional application No. 60/542,852, filed on Feb. 10, 2004, provisional application No. 60/542,850, filed on Feb. 10, 2004, provisional application No. 60/543,328, filed on Feb. 11, 2004.

(30) Foreign Application Priority Data

Mar. 11, 2004 (KR) ............... 10-2004-0016564

(51) Int. Cl.
 *H04N 5/85* (2006.01)
(52) U.S. Cl. ..................... 386/95; 386/126
(58) Field of Classification Search ............. 386/105, 386/95, 96, 98; 348/556, 468, 564, 467, 348/461

See application file for complete search history.

(56) References Cited

U.S. PATENT DOCUMENTS

| 3,128,434 A | 4/1964 | Moreines |
| 5,253,530 A | 10/1993 | Letcher, III |

(Continued)

FOREIGN PATENT DOCUMENTS

| CN | 1348588 | 5/2002 |

(Continued)

OTHER PUBLICATIONS

International Search Report issued Apr. 5, 2005 in corresponding International Application No. PCT/KR2004/003205.

(Continued)

*Primary Examiner*—David E Harvey
(74) *Attorney, Agent, or Firm*—Harness, Dickey & Pierce, PLC

(57) ABSTRACT

A method and a text subtitle decoder for decoding a text subtitle stream recorded on a recording medium are disclosed. A subtitle loading buffer initially loads a text subtitle stream including a dialog style segment defining a group of region styles and a dialog presentation segment having dialog presentation information and dialog text data for a dialog having at least one region. A text subtitle processor parses the dialog presentation segment into composition information, rendering information, and the dialog text data for each region. Next, a text renderer renders the text strings into a bitmap object for each region according to the rendering information, and the rendered bitmap object is composed in a graphics plane.

84 Claims, 15 Drawing Sheets

U.S. PATENT DOCUMENTS

| | | | | |
|---|---|---|---|---|
| 5,467,142 | A | * | 11/1995 | Ichinokawa ............... 348/556 |
| 5,519,443 | A | * | 5/1996 | Salomon et al. ............ 348/467 |
| 5,537,151 | A | | 7/1996 | Orr et al. |
| 5,758,007 | A | | 5/1998 | Kitamura et al. |
| 5,778,142 | A | | 7/1998 | Taira et al. |
| 5,781,687 | A | | 7/1998 | Parks |
| 5,832,530 | A | | 11/1998 | Paknad et al. |
| 5,847,770 | A | | 12/1998 | Yagasaki |
| 5,987,214 | A | | 11/1999 | Iwamura |
| 6,009,234 | A | | 12/1999 | Taira et al. |
| 6,128,434 | A | | 10/2000 | Hirayama et al. |
| 6,148,140 | A | | 11/2000 | Okada et al. |
| 6,173,113 | B1 | | 1/2001 | Okada et al. |
| 6,204,883 | B1 | | 3/2001 | Tsukagoshi |
| 6,219,043 | B1 | | 4/2001 | Yogeshwar et al. |
| 6,222,532 | B1 | | 4/2001 | Ceccarelli et al. |
| 6,230,295 | B1 | | 5/2001 | Watkins |
| 6,253,221 | B1 | | 6/2001 | Kim |
| 6,262,775 | B1 | | 7/2001 | Kim |
| 6,297,797 | B1 | * | 10/2001 | Takeuchi et al. ............ 345/467 |
| 6,320,621 | B1 | | 11/2001 | Fu |
| 6,393,196 | B1 | | 5/2002 | Yamane et al. |
| 6,661,467 | B1 | | 12/2003 | Van Der Meer et al. |
| 6,747,920 | B2 | | 6/2004 | Denda et al. |
| 6,792,577 | B1 | | 9/2004 | Kimoto |
| 7,151,617 | B2 | | 12/2006 | Fukushima et al. |
| 7,174,560 | B1 | | 2/2007 | Crinon |
| 7,188,353 | B1 | | 3/2007 | Crinon |
| 7,370,274 | B1 | | 5/2008 | Stuple et al. |
| 2002/0004755 | A1 | | 1/2002 | Balthaser |
| 2002/0010924 | A1 | | 1/2002 | Kalhour |
| 2002/0106193 | A1 | | 8/2002 | Park et al. |
| 2002/0135608 | A1 | | 9/2002 | Hamada et al. |
| 2002/0151992 | A1 | | 10/2002 | Hoffberg et al. |
| 2002/0159757 | A1 | | 10/2002 | Ando et al. |
| 2002/0194618 | A1 | | 12/2002 | Okada et al. |
| 2003/0039472 | A1 | | 2/2003 | Kim |
| 2003/0078858 | A1 | | 4/2003 | Angelopoulos et al. |
| 2003/0085997 | A1 | | 5/2003 | Takagi et al. |
| 2003/0086690 | A1 | | 5/2003 | Chung et al. |
| 2003/0099464 | A1 | | 5/2003 | Oh et al. |
| 2003/0103604 | A1 | | 6/2003 | Kato et al. |
| 2003/0147629 | A1 | | 8/2003 | Kikuchi et al. |
| 2003/0188312 | A1 | | 10/2003 | Bae et al. |
| 2003/0189571 | A1 | | 10/2003 | MacInnis et al. |
| 2003/0189669 | A1 | | 10/2003 | Bowser |
| 2003/0190147 | A1 | | 10/2003 | Lee |
| 2003/0194211 | A1 | | 10/2003 | Abecassis |
| 2003/0202431 | A1 | | 10/2003 | Kim et al. |
| 2003/0206553 | A1 | | 11/2003 | Surcouf et al. |
| 2003/0216922 | A1 | | 11/2003 | Gonzales et al. |
| 2003/0235402 | A1 | | 12/2003 | Seo et al. |
| 2003/0235406 | A1 | | 12/2003 | Seo et al. |
| 2004/0001699 | A1 | | 1/2004 | Seo et al. |
| 2004/0003347 | A1 | | 1/2004 | Saidenberg et al. |
| 2004/0027369 | A1 | | 2/2004 | Kellock et al. |
| 2004/0047605 | A1 | | 3/2004 | Seo et al. |
| 2004/0054771 | A1 | | 3/2004 | Roe et al. |
| 2004/0081434 | A1 | * | 4/2004 | Jung et al. ................. 386/95 |
| 2004/0151472 | A1 | | 8/2004 | Seo et al. |
| 2004/0202454 | A1 | | 10/2004 | Kim et al. |
| 2005/0013207 | A1 | | 1/2005 | Tsumagari et al. |
| 2005/0105888 | A1 | | 5/2005 | Hamada et al. |
| 2005/0147387 | A1 | | 7/2005 | Seo et al. |
| 2006/0013563 | A1 | | 1/2006 | Adolph et al. |
| 2006/0098936 | A1 | | 5/2006 | Ikeda et al. |
| 2006/0156358 | A1 | | 7/2006 | Adolph et al. |
| 2006/0259941 | A1 | | 11/2006 | Goldberg et al. |

FOREIGN PATENT DOCUMENTS

| | | | |
|---|---|---|---|
| CN | 1368732 | | 9/2002 |
| CN | 1864220 | | 11/2006 |
| EP | 0737016 | | 10/1996 |
| EP | 0863509 | | 9/1998 |
| EP | 0971536 | | 9/2001 |
| EP | 0755161 | | 10/2001 |
| EP | 1178691 | | 2/2002 |
| EP | 1 198 132 | | 4/2002 |
| EP | 1326451 | | 7/2003 |
| GB | 1586431 | * | 3/1981 |
| JP | 09-102940 | | 4/1997 |
| JP | 11252518 | | 9/1999 |
| JP | 2000-324395 | | 11/2000 |
| JP | 2002-290895 | | 10/2002 |
| JP | 2003-061098 | | 2/2003 |
| JP | 2003-224826 | | 8/2003 |
| JP | 2003-230136 | | 8/2003 |
| KR | 1020010001725 A | | 1/2001 |
| KR | 10-2002-0043812 | | 6/2002 |
| KR | 1020030030554 A | | 4/2003 |
| RU | 2229174 | | 5/2004 |
| TW | 200407812 | | 10/2003 |
| TW | 578068 | | 3/2004 |
| WO | WO 03/105152 | | 12/2003 |
| WO | WO 2005/034122 | | 4/2005 |
| WO | WO 2005-034122 | | 4/2005 |
| WO | WO 2005/045833 | | 5/2005 |
| WO | WO 2005/074394 | | 8/2005 |
| WO | WO 2005/079171 | | 9/2005 |
| WO | WO 2005/083708 | | 9/2005 |

OTHER PUBLICATIONS

Taiwanese Office Action dated Apr. 30, 2008.
United States Office Action dated May 14, 2008.
United States Office Action dated Apr. 29, 2008.
United States Office Action dated Apr. 14, 2008.
Microsoft, "*Understanding SAMI 1.0*", Feb. 2003, http://msdn2.microsoft.com/en-us/library/ms971327(d=printerr).aspx>.
International Search Report dated Aug. 8, 2007.
European Office Action dated Sep. 4, 2007.
European Office Action dated Dec. 13, 2007.
European Office Action dated Dec. 17, 2007.
Jakob Nielson's Alertbox for Jul. 1, 1997, "Effective Use of Style Sheets," www.useit.com/alertbox/9709a.html.
English translation of Taiwanese Office Action dated Jun. 16, 2008.
English translation of Chinese Office Action dated Jun. 6, 2008.
English translation of Chinese Office Action dated Sep. 26, 2008.
Malaysian Office Action dated Nov. 14, 2008.
Russian Office Action dated Jan. 23, 2009.
Office Action for counterpart European patent application No. 05721895 dated Apr. 9, 2009.
Notice of Allowance for counterpart Russian patent application No. 2006132328/28(035162) datd Mar. 26, 2009.

* cited by examiner

TEXT SUBTITLE DECODER AND METHOD FOR DECODING TEXT SUBTITLE STREAMS

DOMESTIC PRIORITY INFORMATION

This application claims the benefit of priority under 35 U.S.C. §119 on U.S. Provisional Patent Application 60/542,852, filed Feb. 10, 2004; U.S. Provisional Patent Application 60/542,850, filed Feb. 10, 2004; and U.S. Provisional Patent Application 60/543,328, filed Feb. 11, 2004.

FOREIGN PRIORITY INFORMATION

This application claims the benefit of Korean Patent Application No. 10-2004-0016564, filed on Mar. 11, 2004, which is hereby incorporated by reference.

BACKGROUND OF THE INVENTION

1. Field of the Invention

The present invention relates to a text subtitle decoder and a method for decoding text subtitle streams recorded on a recording medium, an example of which is a Blu-ray disc (BD).

2. Discussion of the Related Art

Optical discs are widely used as an optical recording medium for recording mass data. Presently, among a wide range of optical discs, a new high-density digital video disc (hereinafter referred to as "HD-DVD"), such as a Blu-ray Disc (hereafter referred to as "BD"), is under development for writing and storing high definition video and audio data. Currently, global standard technical specifications of the Blu-ray Disc (BD), which is known to be the next generation HD-DVD technology, are under establishment as a next generation optical recording solution that is able to have a data significantly surpassing the conventional DVD, along with many other digital apparatuses.

Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus. Particularly, in order to effectively reproduce the data from the Blu-ray Disc (BD), not only should the main AV data as well as various data required for a user's convenience, such as subtitle information as the supplementary data related to the main AV data, be provided, but also managing information for reproducing the main data and the subtitle data recorded in the optical disc should be systemized and provided.

However, in the present Blu-ray Disc (BD) standards, since the standards of the supplementary data, particularly the subtitle information, are not completely consolidated, there are many restrictions in the full-scale development of a Blu-ray Disc (BD) basis optical reproducing apparatus. And, such restrictions cause problems in providing the supplementary data such as subtitles to the user.

SUMMARY OF THE INVENTION

Accordingly, the present invention is directed to a text subtitle decoder and a method for decoding text subtitle streams recorded on a recording medium that substantially obviates one or more problems due to limitations and disadvantages of the related art.

An object of the present invention is to provide a method and a text subtitle decoder for decoding a text subtitle stream recorded on a recording medium, which includes text strings for each dialog region and composition and rendering information required for decoding the text strings.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for decoding a text subtitle stream recorded on a recording medium is provided. Initially, a text subtitle stream recorded on the recording medium is loaded into a subtitle loading buffer, where the text subtitle stream includes a dialog style segment and a dialog presentation segment. The dialog style segment defines a group of region styles, and the dialog presentation segment includes dialog presentation information and dialog text data for dialog having at least one region. Thereafter, the dialog presentation segment is parsed into composition information, rendering information, and the dialog text data for each region.

The parsed composition information and rendering information are then stored in a first buffer, and the parsed dialog text data are stored in a second buffer, where the dialog text data stored in the second buffer includes one or more text strings for each region. The text strings stored in the second buffer are rendered into a bitmap object for each region according to the rendering information, and the rendered bitmap object is stored into a third buffer. Finally, the stored bitmap object is composed in a graphics plane for each region according to the composition information.

In another aspect of the present invention, a text subtitle decoder for decoding a text subtitle stream recorded on a recording medium includes a subtitle loading buffer, a text subtitle processor, a dialog composition buffer, a dialog buffer, a text renderer, a bitmap object buffer, and a graphics plane. The subtitle loading buffer initially loads the text subtitle stream, which includes a dialog style segment defining a group of region styles and a dialog presentation segment including dialog presentation information and dialog text data for a dialog having at least one region. The text subtitle processor parses the dialog presentation segment into composition information, rendering information, and the dialog text data for each region. Next, the dialog composition buffer stores the composition and rendering information parsed from the text subtitle processor, and the dialog buffer stores the dialog text data, which includes one or more text strings for each region.

Thereafter, the text renderer included in the text subtitle decoder renders the text strings stored in the dialog buffer into a bitmap object for each region according to the rendering information, and the bitmap object buffer stores the rendered bitmap object. Finally, each bitmap object stored in the bitmap object buffer is composed in the graphics plane according to the composition information.

In further aspect of the present invention, an optical disc player for reproducing text subtitle streams recorded on an optical disc includes an audio decoder configured to decode audio streams recorded on the optical disc into audio data, a video decoder configured to decode video streams recorded on the optical disc into video image data, a text subtitle decoder configured to decode a text subtitle stream recorded o the optical disc into text subtitle image data, and an image superimposition unit configured to superimpose the decoded text subtitle image data with the decoded video image data. The text subtitle decoder includes a text subtitle processor, a text renderer, and a graphics plane. The text subtitle processor initially parses the text subtitle stream into composition information, rendering information, and dialog text data for a dialog having at least one region, where the dialog text data include one or more text strings for each region. The text renderer renders the text strings into graphic data for each region according to the rendering information, and the graphics plane composes the rendered graphic data according to the composition information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In this detailed description, main data represent audio/video (AV) data that belong to a title (e.g., a movie title) recorded in an optical disc by an author. In general, the AV data are recorded in MPEG2 format and are often called AV streams or main AV streams. In addition, supplementary data represent all other data required for reproducing the main data, examples of which are text subtitle streams, interactive graphic streams, presentation graphic streams, and supplementary audio streams (e.g., for a browsable slideshow). Theses supplementary data streams may be recorded in MPEG2 format or in any other data format. They could be multiplexed with the AV streams or could exist as independent data files within the optical disc.

A subtitle represents caption information corresponding to video (image) data being reproduced, and it may be represented in a predetermined language. For example, when a user selects an option for viewing one of a plurality of subtitles represented in various languages while viewing images on a display screen, the caption information corresponding to the selected subtitle is displayed on a predetermined portion of the display screen. If the displayed caption information is text data (e.g., characters), the selected subtitle is often called a text subtitle. According to one aspect of the present invention, a plurality of text subtitle streams in MPEG2 format may be recorded in an optical disc, and they may exist as a plurality of independent stream files. Each text subtitle stream file includes text data for a text subtitle and reproduction control data required for reproduction of the text data. According to another aspect of the present invention, only a single text subtitle stream in MPEG2 format may be recorded in an optical disc.

Figure 1:
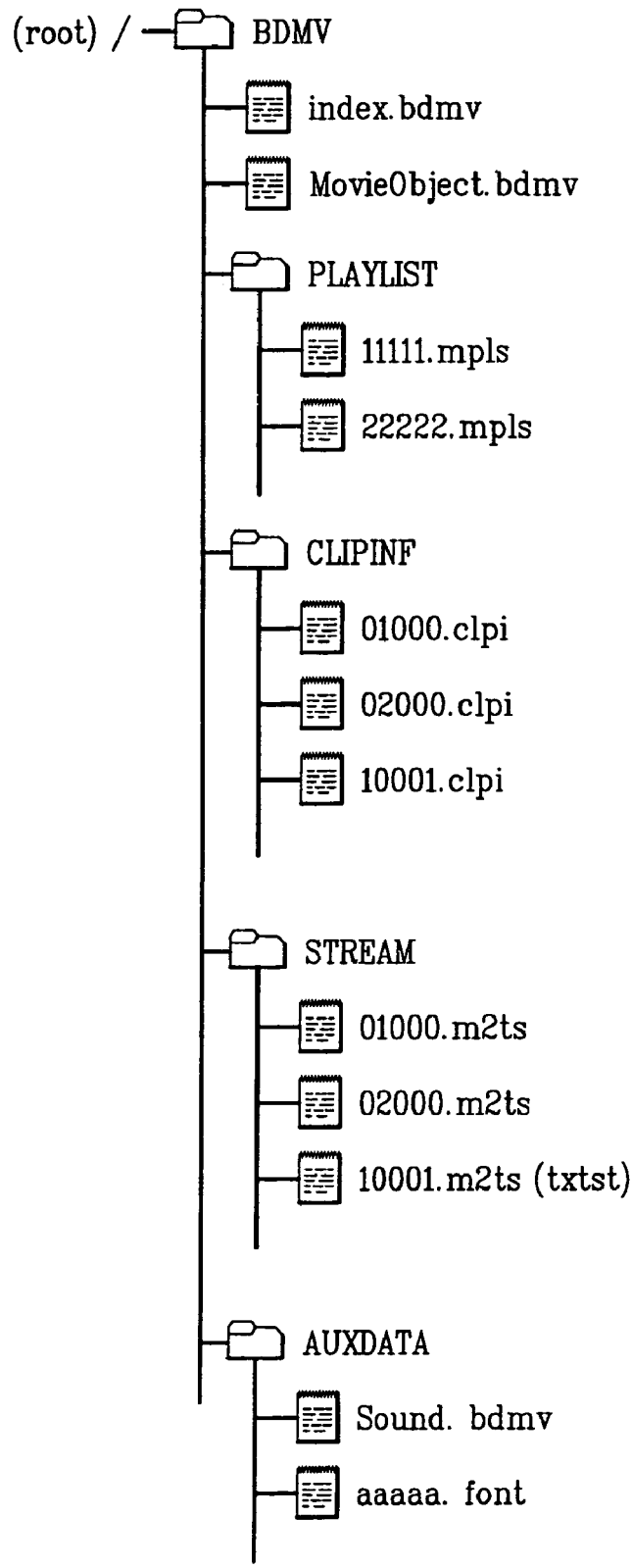
FIG. 1 illustrates a structure of the data files recorded in an optical disc according to the present invention.

FIG. 1 illustrates a file structure of the data files recorded in a Blu-ray disc (hereinafter "BD") according to the present invention. Referring to FIG. 1, at least one BD directory (BDMV) is included in a root directory (root). Each BD directory includes an index file (index.bdmv) and an object file (MovieObject.bdmv), which are used for interacting with one or more users. For example, the index file may contain data representing an index table having a plurality of selectable menus and movie titles. Each BD directory further includes four file directories that include audio/video (AV) data to be reproduced and various data required for reproduction of the AV data.

The file directories included in each BD directory are a stream directory (STREAM), a clip information directory (CLIPINF), a playlist directory (PLAYLIST), and an auxiliary data directory (AUX DATA). First of all, the stream directory (STREAM) includes audio/video (AV) stream files having a particular data format. For example, the AV stream files may be in the form of MPEG2 transport packets and be named as "*.m2ts", as shown in FIG. 1. The stream directory may further include one or more text subtitle stream files, where each text subtitle stream file includes text (e.g., characters) data for a text subtitle represented in a particular language and reproduction control information of the text data. The text subtitle stream files exist as independent stream files within the stream directory and may be named as "*.m2ts" or "*.txtst", as shown in FIG. 1. An AV stream file or text subtitle stream file included in the stream directory is often called a clip stream file.

Next, the clip information directory (CLIPINF) includes clip information files that correspond to the stream files (AV or text subtitle) included in the stream directory, respectively. Each clip information file contains property and reproduction timing information of a corresponding stream file. For example, A clip information file may includes mapping information, in which presentation time stamps (PTS) and source packet numbers (SPN) are one-to-one mapped by an entry point map (EPM). Using the mapping information, a particular location of a stream file may be determined from timing information (In-Time and Out-Time) provided by a PlayItem or SubPlayItem, which will be discussed later in more details. In the industry standard, each pair of a stream file and its corresponding clip information file is designated as a clip. For example, 01000.clpi included in CLIPINF includes property and reproduction timing information of 01000.m2ts included in STREAM, and 01000.clpi and 01000.m2ts form a clip.

Referring back to FIG. 1, the playlist directory (PLAYLIST) includes one or more PlayList files (*.mpls), where each PlayList file includes at least one PlayItem which designates at least one main AV clip and the reproduction time of the main AV clip. More specifically, a PlayItem contains information designating In-Time and Out-Time, which represent reproduction begin and end times for a main AV clip designated by Clip_Information_File_Name within the PlayItem. Therefore, a PlayList file represents the basic reproduction control information for one or more main AV clips. In addition, the PlayList file may further include a SubPlayItem, which represents the basic reproduction control information for a text subtitle stream file. When a SubPlayItem is included in a PlayList file to reproduce one or more text subtitle stream files, the SubPlayItem is synchronized with the PlayItem(s). On the other hand, when the SubPlayItem is used to reproduce a browsable slideshow, it may not be synchronized with the PlayItem(s). According to the present invention, the main function of a SubPlayItem is to control reproduction of one or more text subtitle stream files.

Lastly, the auxiliary data directory (AUX DATA) may include supplementary data stream files, examples of which are font files (e.g., aaaaa.font), pop-up menu files (not illustrated), and sound files (e.g., Sound.bdmv) for generating click sound. The text subtitle stream files mentioned earlier may be included in the auxiliary data directory instead of the stream directory.

Figure 2:
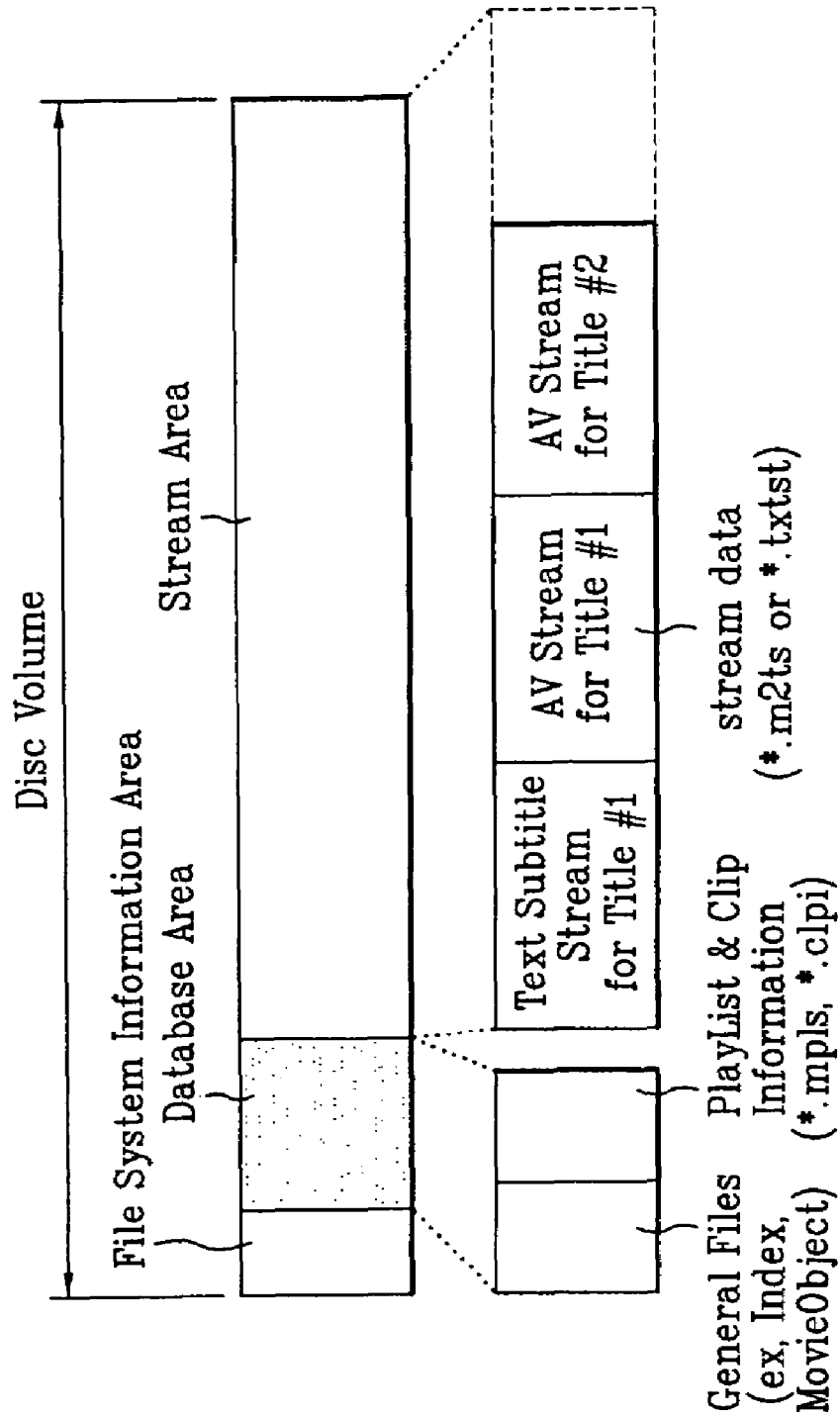
FIG. 2 illustrates data storage areas of an optical disc according to the present invention.

FIG. 2 illustrates data storage areas of an optical disc according to the present invention. Referring to FIG. 2, the optical disc includes a file system information area occupying the inmost portion of the disc volume, a stream area occupying the outmost portion of the disc volume, and a database area occupied between the file system information area and the stream area. In the file system information area, system information for managing the entire data files shown in FIG. 1 is stored. Next, AV streams and one or more text subtitle streams are stored in the stream area. The general files, PlayList files, and clip information files shown in FIG. 1 are stored in the database area of the disc volume. As discussed above, the general files include an index file and an object file, and the PlayList files and clip information files include information required to reproduce the AV streams and the text subtitle streams stored in the stream area. Using the information stored in the database area and/or stream area, a user is able to select a specific playback mode and to reproduce the main AV and text subtitle streams in the selected playback mode.

Figure 3:
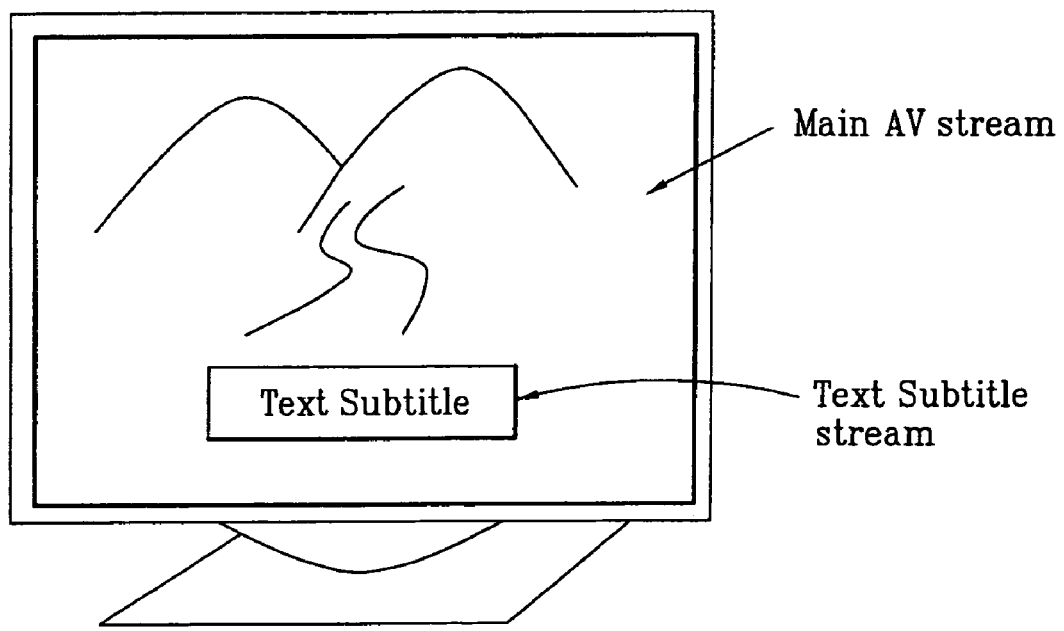
FIG. 3 illustrates a text subtitle and a main image presented on a display screen according to the present invention.

FIG. 3 illustrates a text subtitle and a main image presented on a display screen according to the present invention. The main image and the text subtitle are simultaneously displayed on the display screen when a main AV stream and a corresponding text subtitle stream are reproduced in synchronization.

Figure 4:
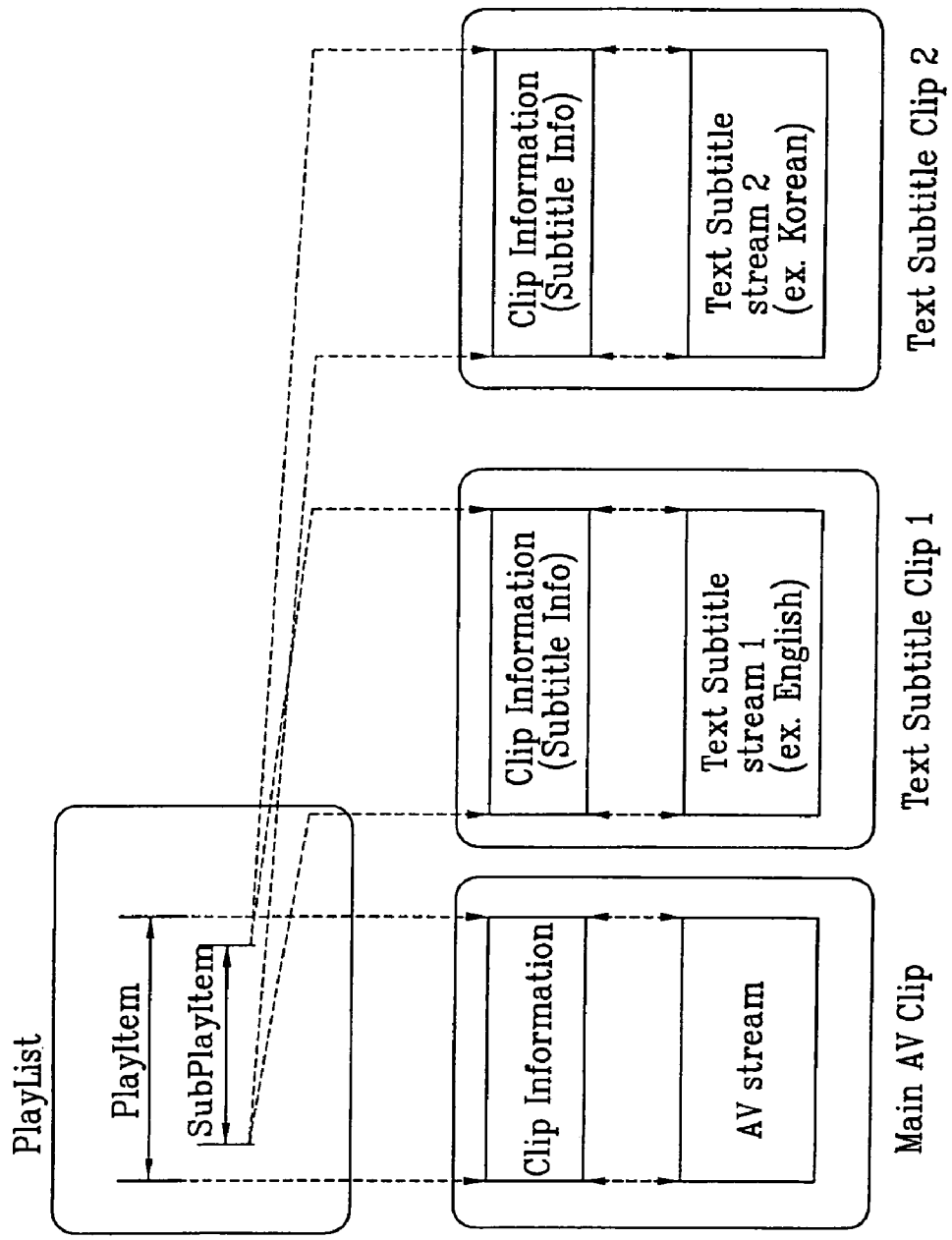
FIG. 4 illustrates a schematic diagram illustrating reproduction control of a main AV clip and text subtitle clips according to the present invention.

FIG. 4 is a schematic diagram illustrating reproduction control of a main AV clip and text subtitle clips according to the present invention. Referring to FIG. 4, a PlayList file includes at least one PlayItem controlling reproduction of at least one main AV clip and a SubPlayItem controlling reproduction of a plurality of text subtitle clips. One of text subtitle clip 1 and text subtitle clip 2 shown in FIG. 4 for English and Korean text subtitles may be synchronized with the main AV clip such that a main image and a corresponding text subtitle are displayed on a display screen simultaneously at a particular presentation time. In order to display the text subtitle on the display screen, display control information (e.g., position and size information) and presentation time information, examples of which are illustrated in FIG. 5A to FIG. 5C, are required.

Figure 5A:
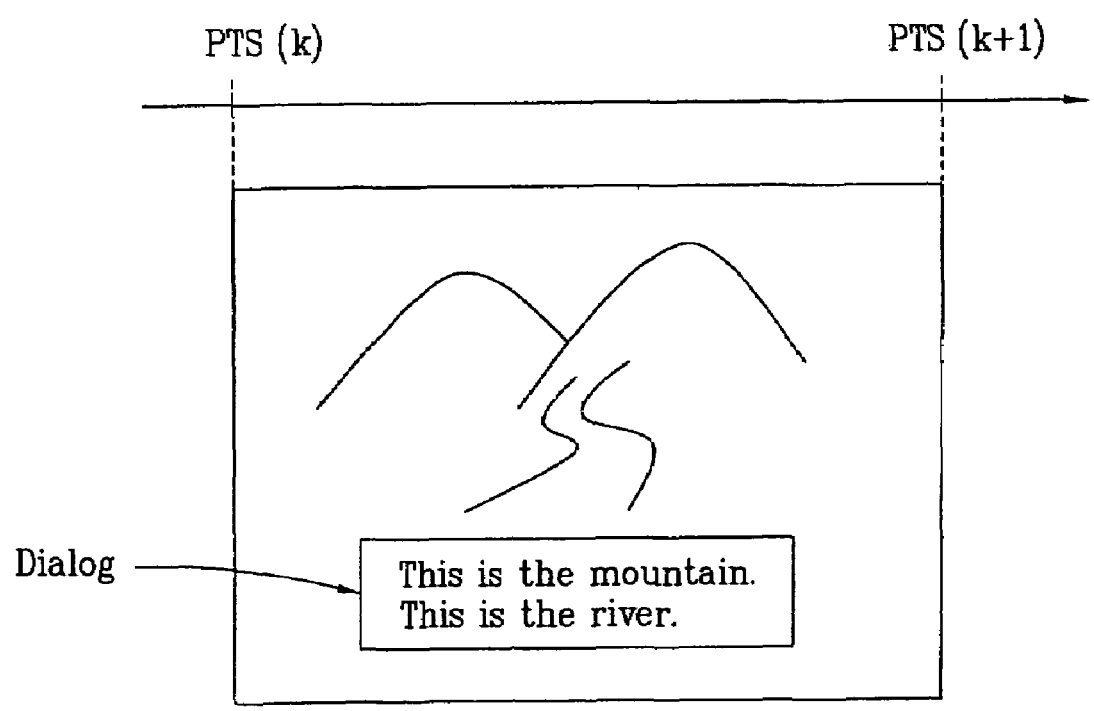
FIG. 5A illustrates a dialog presented on a display screen according to the present invention.

FIG. 5A illustrates a dialog presented on a display screen according to the present invention. A dialog represents entire text subtitle data displayed on a display screen during a given presentation time. In general, presentation times of the dialog may be represented in presentation time stamps (PTS). For example, presentation of the dialog shown in FIG. 5A starts at PTS (k) and ends at PTS (k+1). Therefore, the dialog shown in FIG. 5A represents an entire unit of text subtitle data which are displayed on the display screen between PTS (k) and PTS (k+1). A dialog includes at least one line of subtitle text (characters). When there are two or more lines of subtitle text in a dialog, entire text data may be displayed according to a style defined for the dialog.

Figure 5B:
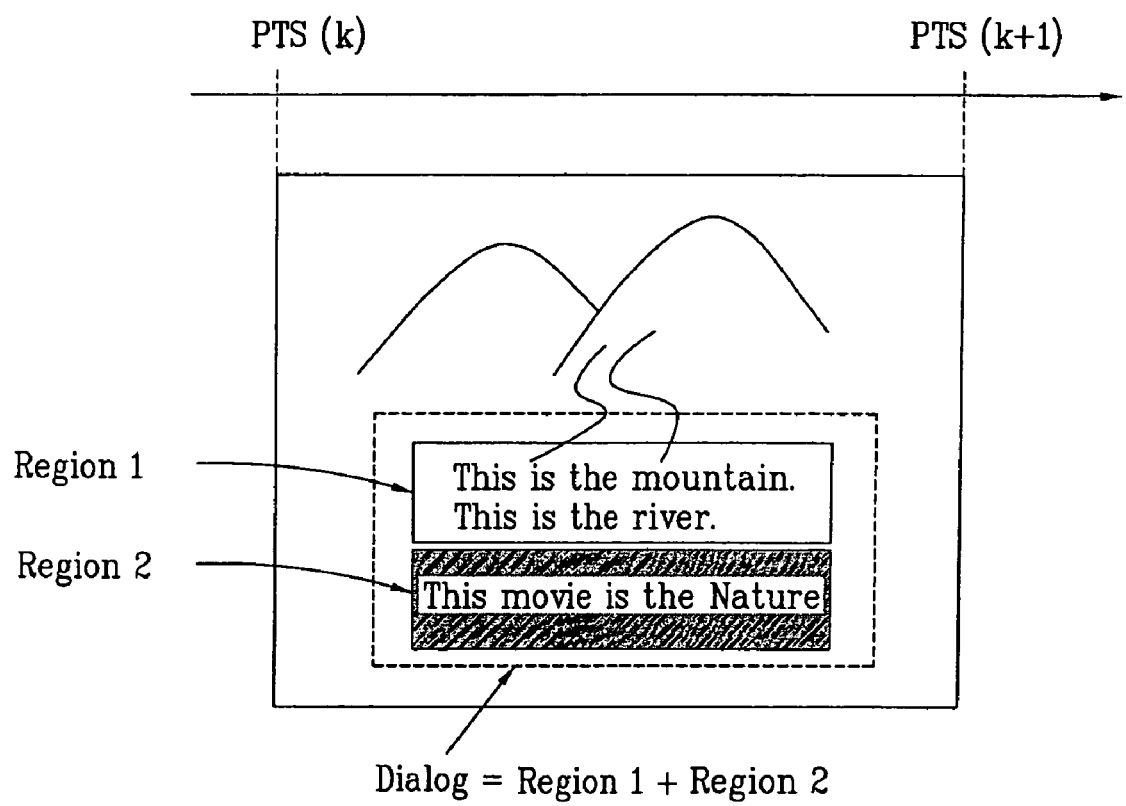
FIG. 5B illustrates regions of a dialog presented on a display screen according to the present invention.

In addition, FIG. 5B illustrates regions of a dialog according to the present invention. A region represents a divided portion of text subtitle data (dialog) displayed on a display screen during a given presentation time. In other words, a dialog includes at least one region, and each region may include at least one line of subtitle text. The entire text subtitle data representing a region may be displayed on the display screen according to a region style (global style) assigned to the region. The maximum number of regions included in a dialog should be determined based on a desired decoding rate of the subtitle data because the greater number of regions generally results a lower decoding ratio. For example, the maximum number of regions for a dialog may be limited to two in order to achieve a reasonably high decoding rate. However, the maximum number could be greater than two for other purposes.

Figure 5C:
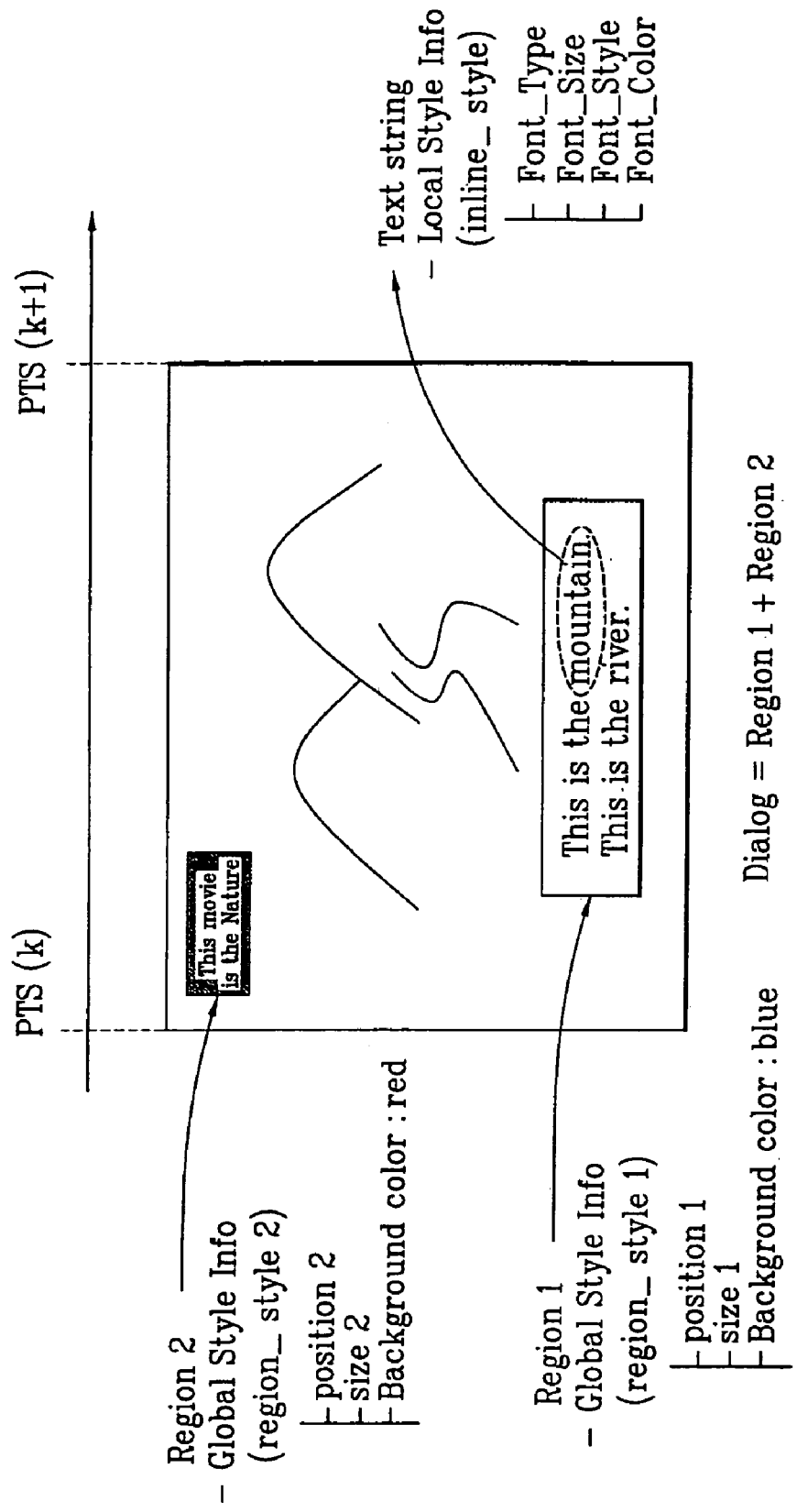
FIG. 5C illustrates style information for regions of a dialog according to the present invention.

FIG. 5C illustrates style information for regions of a dialog according to the present invention. Style information represents information defining properties required for displaying at least a portion of a region included in a dialog. Some of the examples of the style information are position, region size, background color, text alignment, text flow information, and many others. The style information may be classified into region style information (global style information) and inline style information (local style information).

Region style information defines a region style (global style) which is applied to an entire region of a dialog. For example, the region style information may contain at least one of a region position, region size, font color, background color, text flow, text alignment, line space, font name, font style, and font size of the region. For example, two different region styles are applied to region 1 and region 2, as shown in FIG. 5C. A region style with position 1, size 1, and blue background color is applied to Region 1, and a different region style with position 2, size 2, and red background color is applied to Region 2.

On the other hand, inline style information defines an inline style (local style) which is applied to a particular portion of text strings included in a region. For example, the inline style information may contain at least one of a font type, font size, font style, and font color. The particular portion of text strings may be an entire text line within a region or a particular portion of the text line. Referring to FIG. 5C, a particular inline style is applied to the text portion "mountain" included in Region 1. In other words, at least one of the font type, font size, font style, and font color of the particular portion of text strings is different from the remaining portion of the text strings within Region 1.

Figure 6A:
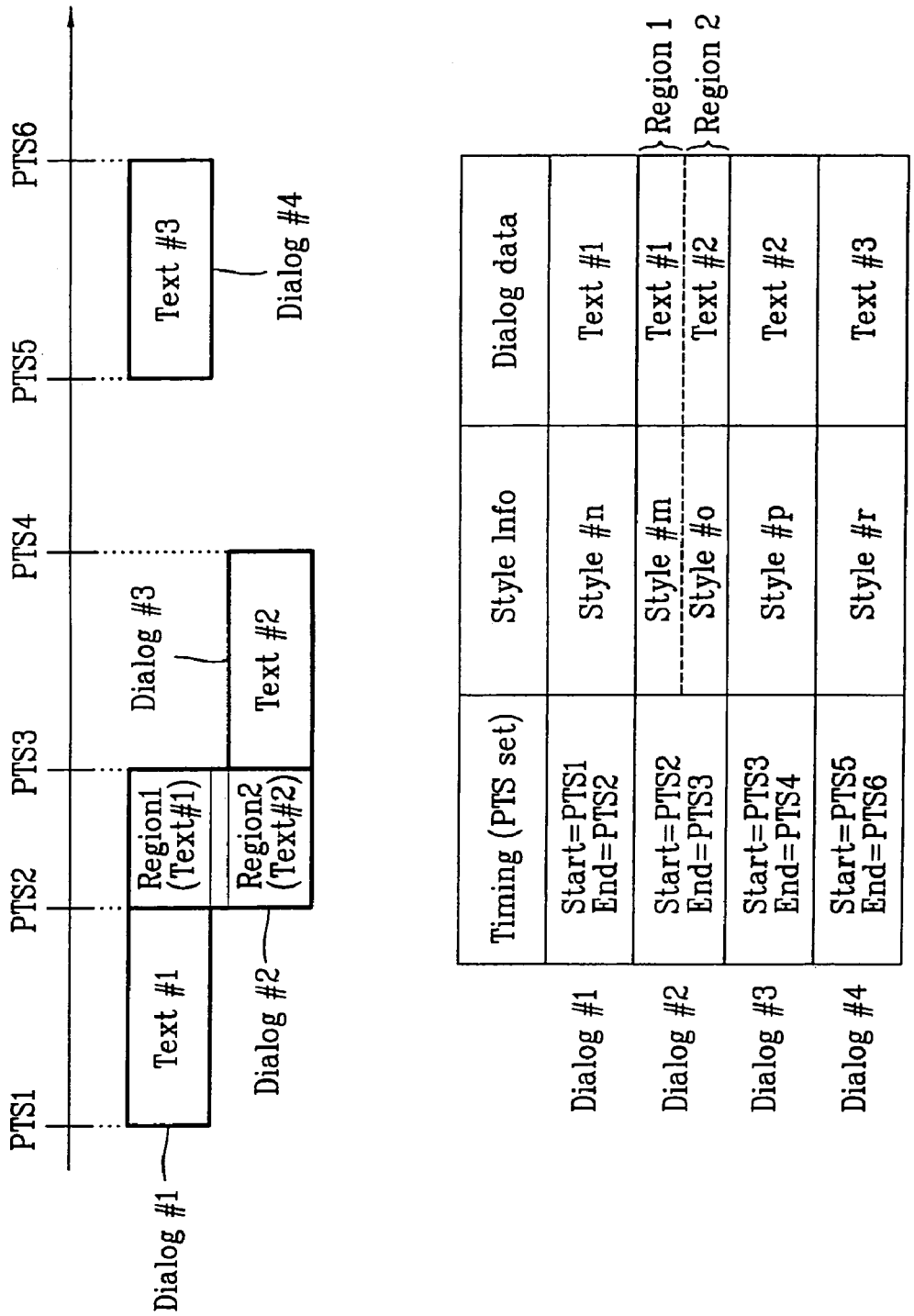
FIG. 6A illustrates presentations of text subtitle dialogs on a display screen in presentation time stamps.

FIG. 6A illustrates presentations of text subtitle dialogs on a display screen in presentation time stamp (PTS) intervals. There are four dialogs to be displayed between PTS1 to PTS6. More specifically, Dialog #1 has only one region and Text #1 is displayed within this region between PTS1 to PTS2. Next, Dialog #2 has Region 1 and Region 2 and Text #1 and Text #2 are displayed within Region 1 and Region 2, respectively, between PTS2 to PTS3. Thereafter, Dialog #3 also has only one region and Text #2 is displayed within this region between PTS3 and PTS4. There is no dialog to be presented between PTS4 to PTS5, and Text #3 is displayed within a region of Dialog #4 between PTS5 to PTS6. Information defining a dialog includes dialog presentation time information and dialog text data including style information and text strings to be displayed within each region of the dialog. An example of the presentation time information is a set of start PTS start and PTS end, and the style information includes region (global) style information and inline (local) style information described above. It is shown in FIG. 6A that different style information sets may be applied to the dialogs.

Figure 6B:
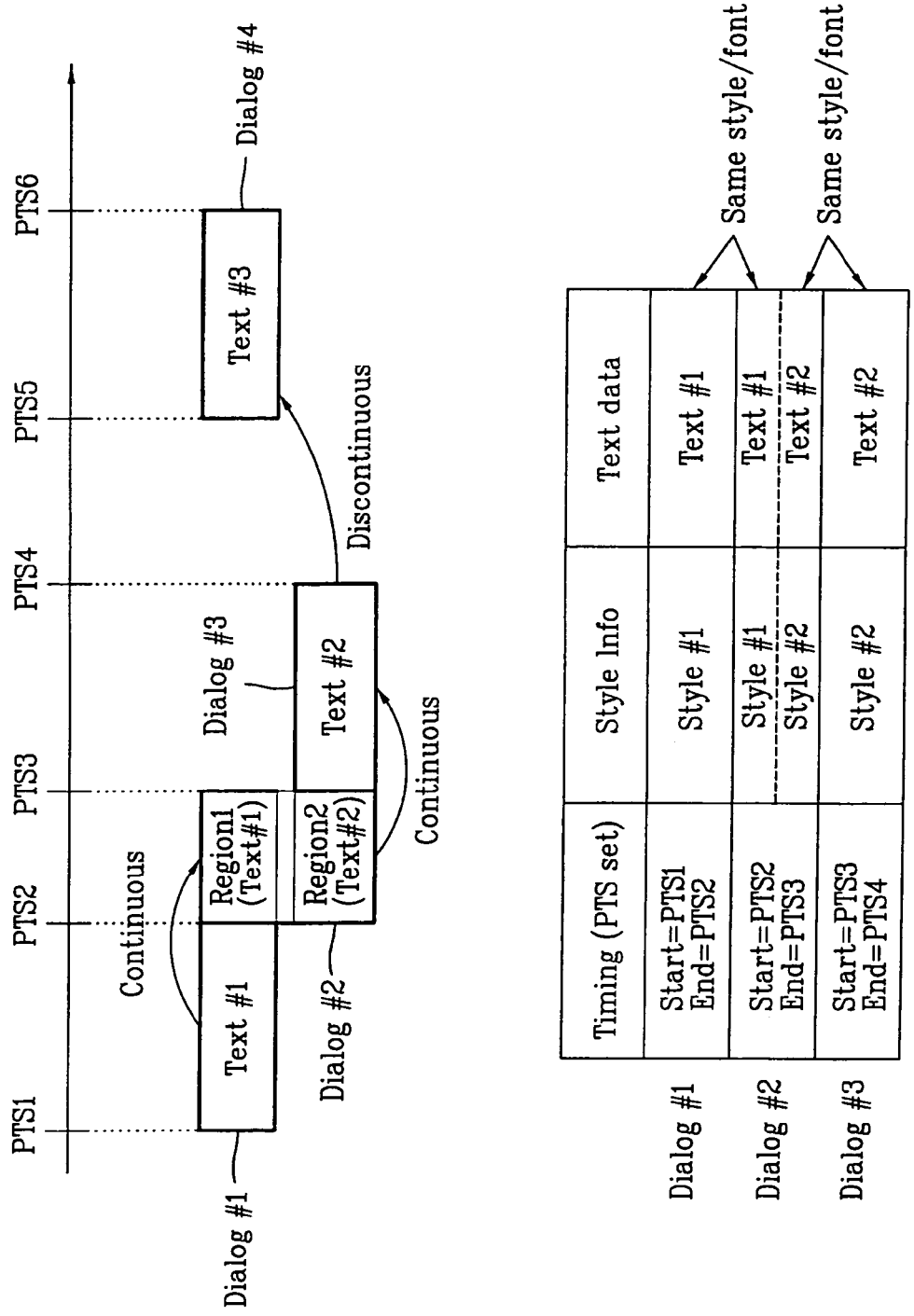
FIG. 6B illustrates continuities between text subtitle dialogs being presented on a display screen.

FIG. 6B illustrates continuities between text subtitle dialogs being presented on a display screen in PTS intervals. Referring to FIG. 6B, a continuity exists between Dialog #1 and Dialog #2. Display of Text #1 in a region of Dialog #1 is continuous with display of Text #1 in Region 1 of Dialog #2. In other words, PTS intervals of both dialogs are continuous and same style information (region and inline) is used when presenting Text #1 in both regions. Similarly, another continuity exists between Dialog #2 and Dialog #3 because display of Text #2 in Region 2 of Dialog #2 is continuous with display of Text #2 in a region of Dialog #3. In order to ensure a continuity between two consecutive dialogs displaying same subtitle text, presentation times (PTS intervals) of the dialogs must be continuous. In addition, same region and inline style information must be used when presenting the same text in the regions, respectively. Referring back to FIG. 6B, there is no continuity between Dialog #3 and Dialog #4 because their PTS intervals are not continuous. An indicator (e.g., continuous_presentation_flag) may be included in presentation information of a current dialog to indicate whether the dialog is continuous with a previous dialog.

Figure 7A:
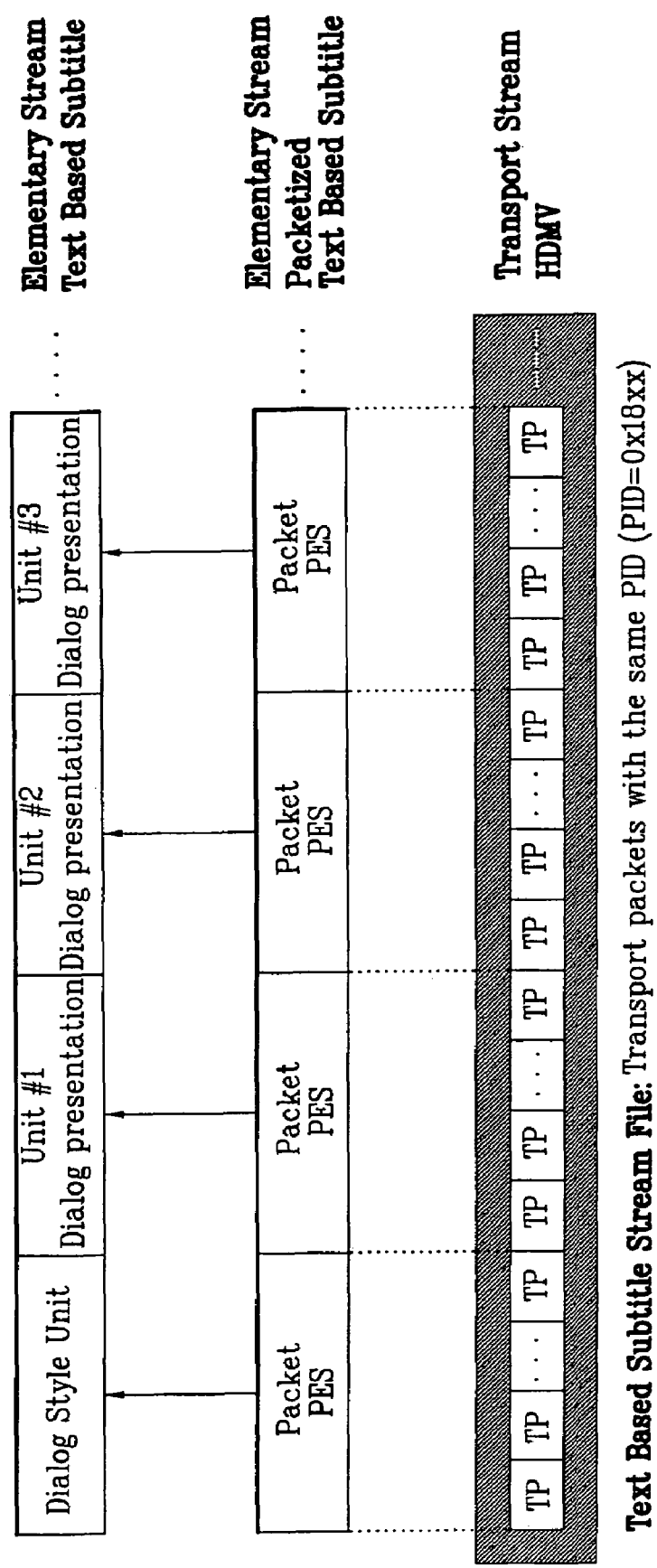
FIG. 7A illustrates the structure of a text subtitle stream file according to the present invention.

FIG. 7A illustrates a text subtitle stream file (e.g., 10001.m2ts shown in FIG. 1) according to the present invention. It may be formed of an MPEG2 transport stream including a plurality of transport packets (TP), all of which have a same packet identifier (e.g., PID=0x18xx). When a disc player receives many input streams including a particular text subtitle stream, it finds all the transport packets that belong to the text subtitle stream using their PIDs. Referring to FIG. 7A, each sub-set of transport packets form a packet elementary stream (PES) packet. One of the PES packets shown in FIG. 7A corresponds to a dialog style unit (DSU) defining a group of region styles. A DSU is also often referred as a dialog style segment (DSS). All the remaining PES packets correspond to dialog presentation units (DPUs), each of which includes presentation information for a dialog having at least one region, and dialog text data which includes an region style indicator, inline style information, and text strings for each region.

Figure 7B:
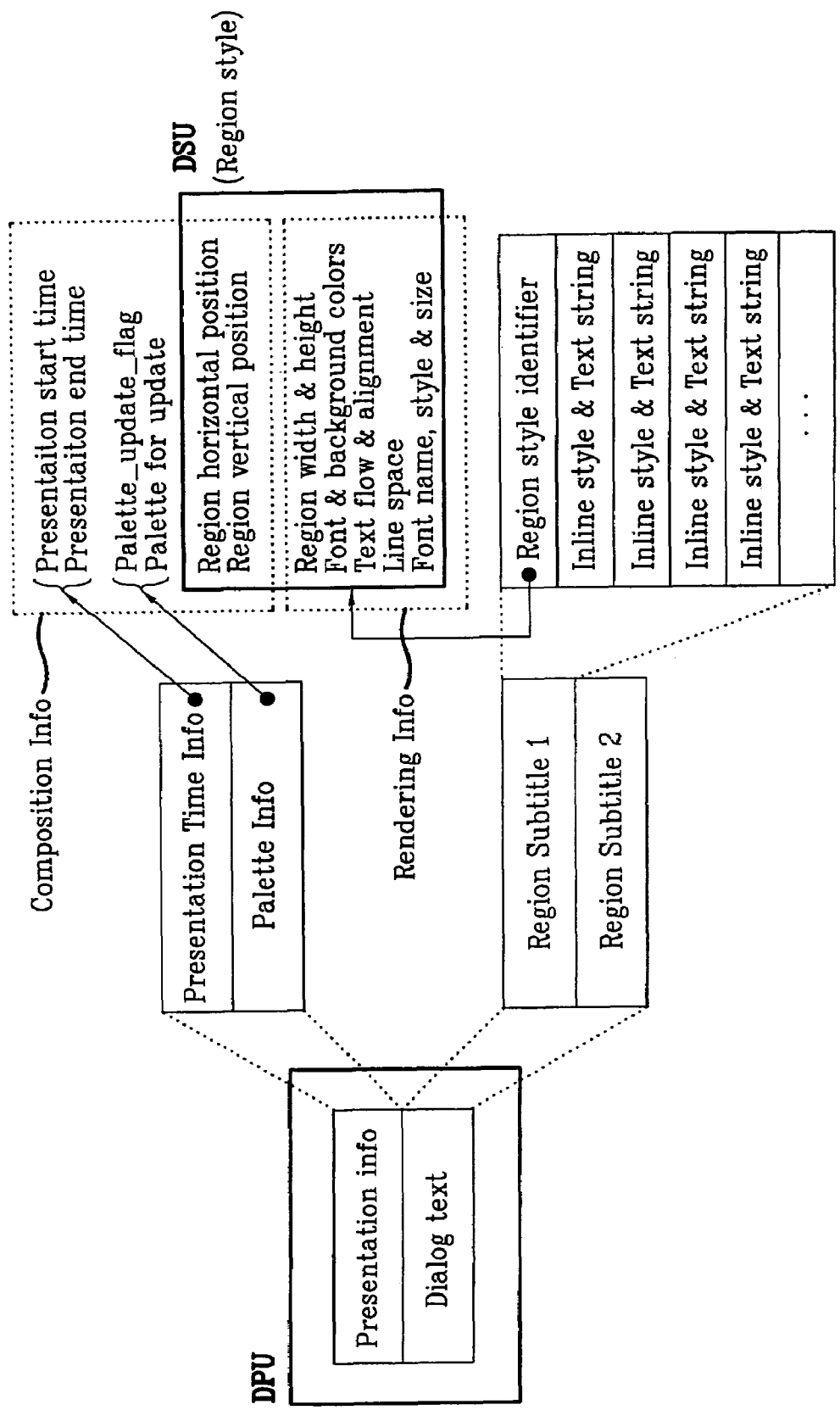
FIG. 7B illustrates specific information contained in a DPU and a DSU included in a text subtitle stream according to the present invention.

FIG. 7B illustrates specific information contained within a DPU and a DSU included in a text subtitle stream according to the present invention. A DSU contains information sets defining a group of region styles, each of which is applied to a corresponding region of a dialog. In addition, a DPU contains dialog text data and dialog presentation information for a dialog. The dialog text data includes text strings to be included in each region of the dialog, inline style information to be applied to a particular portion of the text strings, and a region style identifier indicating a region style to be applied to each dialog region. The region style identifier identifies one of the group of region styles defined in the DSU. On the other hand, the dialog presentation information includes presentation time information and palette (color) update information for a dialog. The presentation time information may include presentation start time (e.g, PTS_start) and presentation end time (e.g., PTS_end) for presenting the dialog on a display screen, and the palette update information may include an indicator (e.g., palette_update_flag) indicating whether to update display colors of the dialog and palette information (e.g., Palette for update) to be applied when updating the display colors.

All the data included in a text subtitle stream may be classified into three types of data based on their basic functions. For example, the data could be classified into dialog text data, composition information, and rendering information, as shown in FIG. 7B. The dialog text data include text string(s), inline style information, and a region style identifier for each region of a dialog. The composition information includes presentation time information, examples of which are presentation start and end times, position information for a dialog region, and palette update information for a dialog. Lastly, the rendering information includes information required for rendering the text strings to graphic data for presentation. Referring to FIG. 7B, the horizontal and vertical positions of each region included in the DSU is a part of the composition information, and the region width, region height, font color, background color, text flow, text alignment, line space, font name, font style, and font size included in the DSU represent the rendering information.

Figure 8:
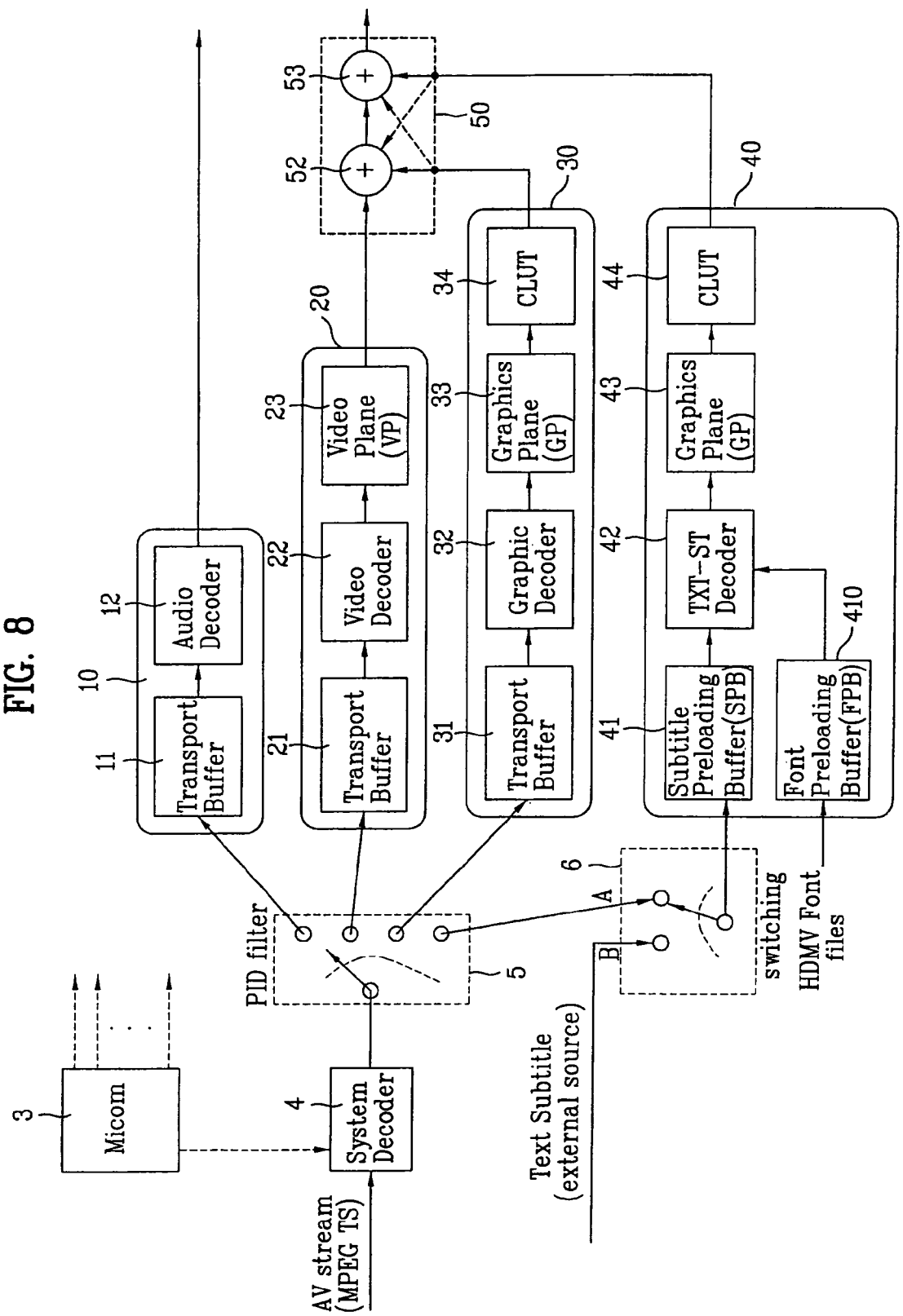
FIG. 8 illustrates an apparatus for decoding main AV streams and text subtitle streams according to the present invention.

Reference will now be made in detail to an apparatus for decoding man AV streams and text subtitle streams according to the present invention, an example of which is illustrated in FIG. 8. The apparatus includes a packet identifier (PID) filter 5 for separating input streams into video streams, audio streams, graphic streams, and text subtitle streams based on their packet identifiers, a video decoding part 20 for decoding the video streams, an audio decoding part 10 for decoding the audio streams, a graphic decoding part 30 for decoding the graphic streams, and a text subtitle decoding part 40 for decoding the text subtitle streams.

The text subtitle streams may be extracted from an optical disc or from an additional external source, as shown in FIG. 8. For this reason, the apparatus additionally includes a switch 6 which selects an input data source. Therefore, if the text subtitle streams are extracted from the optical disc, the switch 6 selects data line A connected to the PID filter 5. On the other hand, if they are inputted from the external source, the switch 6 selects line B connected to the external source.

Referring back to FIG. 8, the audio decoding part 10, video decoding part 20, and graphic decoding part 30 include transport buffers 11, 21, and 31, respectively, for storing stream data to be decoded. A video plane (VP) 23 and a graphic plane 33 are included in the video decoding part 20 and the graphic decoding part 30, respectively, for converting decoded signals into displayable video and graphic images. The graphic decoding part 30 includes a color look up table (CLUT) 34 for controlling color and transparency levels of the displayable graphic images.

When the text subtitle decoding part 40 receives a text subtitle stream supporting a single language from the switch 6, an entire portion of the text subtitle stream may be preloaded into a subtitle preloading buffer (SPB) 41 at once. Alternatively, when there are more than one text subtitle streams for supporting multi-languages, all the text subtitle streams may be preloaded into the SPB 41 at once. Therefore, the size of the SPB 41 should be determined based on a total number of text subtitle stream files received from the switch 6. For example, the size of the SPB 41 should be greater than or equal to 0.5 megabytes for preloading a 0.5 megabyte text subtitle stream file. In addition, in order to ensure seamless presentation of a text subtitle when a user switches among two 0.5 megabyte text subtitle stream files, the size of the SPB 41 should be greater than or equal to 1 megabytes. The size of the SPB 42 should be large enough to preload all the required text subtitle stream files at once.

The text subtitle decoding part 40 shown in FIG. 8 further includes a font preloading buffer (FPB) 410 for storing all the associated font files which may be included in the auxiliary data directory shown in FIG. 1. Similarly, the size of the FPB 410 should be large enough to preload all the required font files at once in order to ensure seamless presentation of a text subtitle supporting one or more languages. Since all the available text subtitle stream files and related font files are preloaded, extraction and use of the preloaded data can be done in a simple manner. Also the control of the SPB 41 and the FPB 410 could be quite simple due to the this reason. The text subtitle decoding part 40 further includes a text subtitle decoder 42 which decodes each text subtitle stream stored in the SPB 41, a graphic plane 43 in which the decoded subtitle data are composed as displayable subtitle images, and a color look up table (CLUT) 44 controlling at least one of color and transparency levels of the converted subtitle images.

The apparatus shown in FIG. 8 further includes an image superimposition part 50 which superimposes the images outputted from the video decoding part 20, the graphic decoding part 30, and the text subtitle decoding part 40. These combined images are displayed on a display screen, as shown in FIG. 3. In general, the video images outputted from the VP 23 of the video decoding part 20 may be displayed as a background of the display screen, and the images outputted from the graphic decoding part 30 and/or text subtitle decoding part 40 may be superimposed over the video images in a predetermined order. For example, if the output images of the graphic decoding part 30 are presentation graphic images, these images may be initially superimposed over the video images by a first adder 52, and subsequently, the text subtitle images from the text subtitle decoding part 40 may be superimposed over the video images by a second adder 53. However, if the output images of the graphic decoding part 30 are interactive graphic images, the text subtitle images from the text subtitle decoding part 40 may be initially superimposed over the video images by the first adder 52. Thereafter, the interactive graphic images may be further superimposed over the subtitle-superimposed images by the second adder 53.

Lastly, the apparatus shown in FIG. 8 further includes a system decoder 4 for decoding input transport streams (e.g., MPEG transport streams), and a microprocessor 3 for controlling operations of all the components of the apparatus mentioned above.

Reference will now be made in detail to a method and a text subtitle decoder for reproducing text subtitle streams according to the present invention. When an optical disc is preloaded by an optical disc player, an example of which is illustrated in FIG. 8, information required for reproducing main data recorded on the disc is initially extracted from the disc and is stored in a storage (not illustrated). When a particular title that associates with a PlayList is selected by user, at least one text subtitle stream file designated in the PlayList file is initially preloaded in the SPB 41 and font files related to the subtitle stream file are preloaded into the FPB 410.

For example, when a title that associates with the PlayList shown in FIG. 4 is selected by a user, at least one of text subtitle stream files for Text Subtitle Clip 1 (English) and Text Subtitle Clip 2 (Korean) may be initially preloaded into the SPB 41. Also, all the font files related to the text subtitle stream files, which may be designated in clip information files of the text subtitle clips, are preloaded into the FPB 410. Thereafter, playback of the PlayList is started. During the playback of the PlayList, AV streams included in the main AV clip are decoded by the audio decoding part 10 and the video decoding part 20, and one of the preloaded text subtitle streams is decoded by the text subtitle decoder 42. Then the decoded text subtitle images are superimposed over the decoded main video images, and the entire images are displayed on a display screen.

Figure 9:
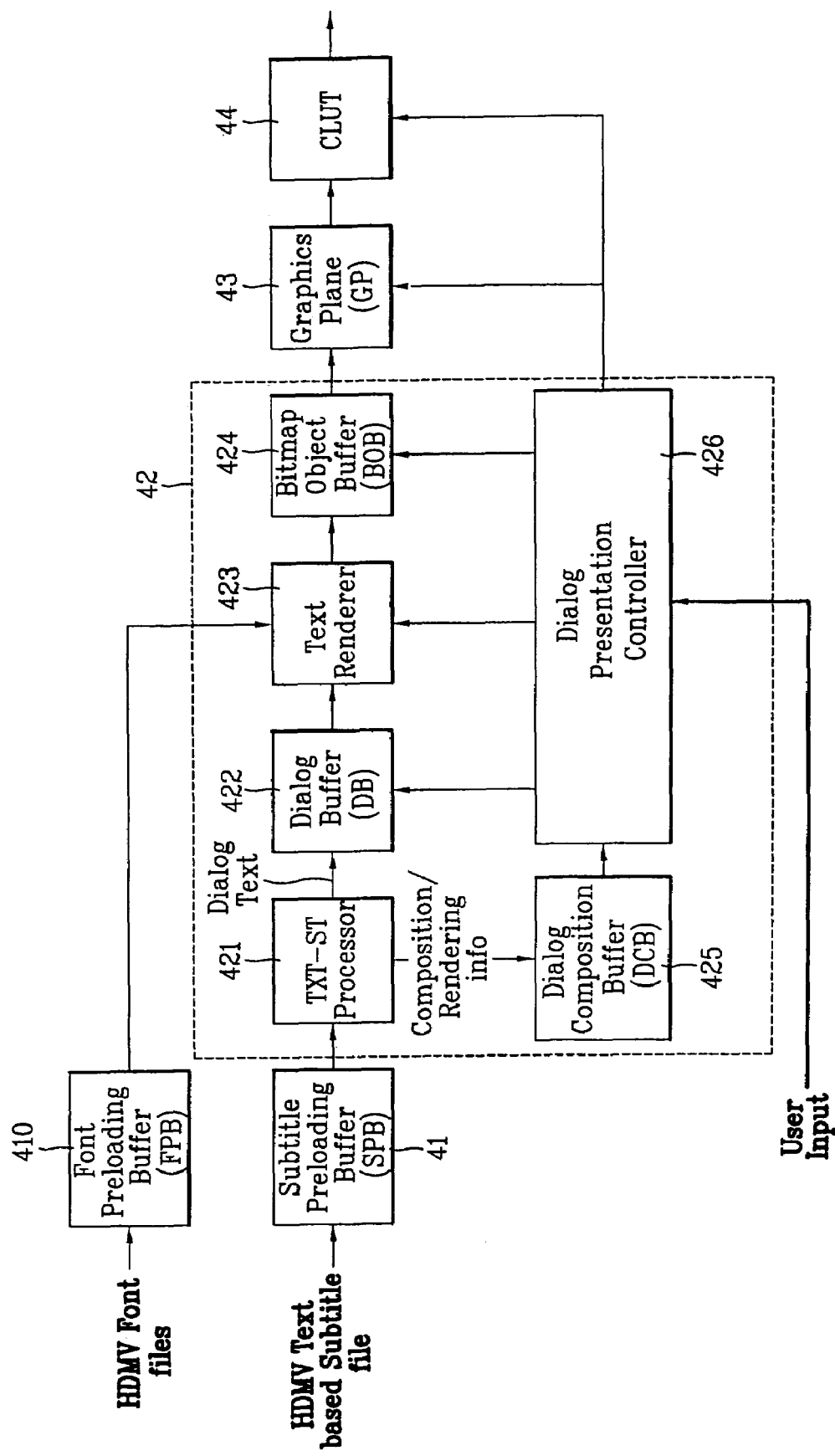
FIG. 9 illustrates a text subtitle decoder according to the present invention.

FIG. 9 illustrates the text subtitle decoder 42 included in the decoding apparatus shown in FIG. 8 in more details. The decoding process performed by the text subtitle decoder 42 includes parsing, rendering, and composition steps. In the parsing step, a text subtitle stream stored in the SPB 41 is parsed into composition information, rendering information, and dialog text data. In the rendering step, text strings included in the dialog text data are rendered into graphic data (bitmap data) for each region using the rendering information, which represents information required for rendering the text strings into the graphic data. Finally, in the composition step, the rendered text strings are added into the GP 43 according to the composition information, which represents dialog presentation information, palette update information, and position information for a dialog.

After one or more text subtitle streams and the related font files are preloaded into the SPB 41 and the FPB 410, respectively, a text subtitle processor 421 included in the text subtitle decoder 42 parses a text subtitle stream preloaded in the SPB 41 into composition information, rendering information, and dialog text data. More particularly, the text subtitle processor 421 initially transfers a dialog style unit (DSU) included in the preloaded subtitle stream to a dialog composition buffer (DCB) 425, and it parses a dialog presentation unit (DPU) further included in the preloaded text subtitle stream into composition information, rendering information, and dialog text data. The composition and rendering information are then stored in the DCB 425, and the dialog text data are stored in a dialog buffer (DB) 422. The dialog text data stored in the DB 422 include a region style identifier, text strings, and inline style information for each dialog region.

Next, a text renderer 423 renders the text strings stored in the DB 422 into a bitmap object (graphic data) for each dialog region under the control of a dialog presentation controller 426. In other words, the text renderer 423 renders the text strings stored in the DB 422 into a bitmap object for each dialog region using the region style identifier and inline style information stored in the DB 422, the rendering information provided from the dialog presentation controller 426, and related font data provided from the FPB 410. The bitmap object rendered by the text renderer 423 for each dialog region is then stored in a bitmap object buffer (BOB) 424.

Finally, each bitmap object stored in the BOB 424 is composed within (added to) the GP 43 according to the composition information provided by the dialog presentation controller 426. The CLUT 44 uses palette update information included in the composition information to adjust color and/ or transparency levels of an output of the GP 43. During the rendering and composition processes performed by the text renderer 423 and the GP 43, particular style information selected by a user may be applied. The dialog presentation controller 426 may receive such user-selected style information and provide this information to the text renderer 423 and/or the GP 43. Examples of the user-selectable style information are a region position and a font size.

Figure 10:
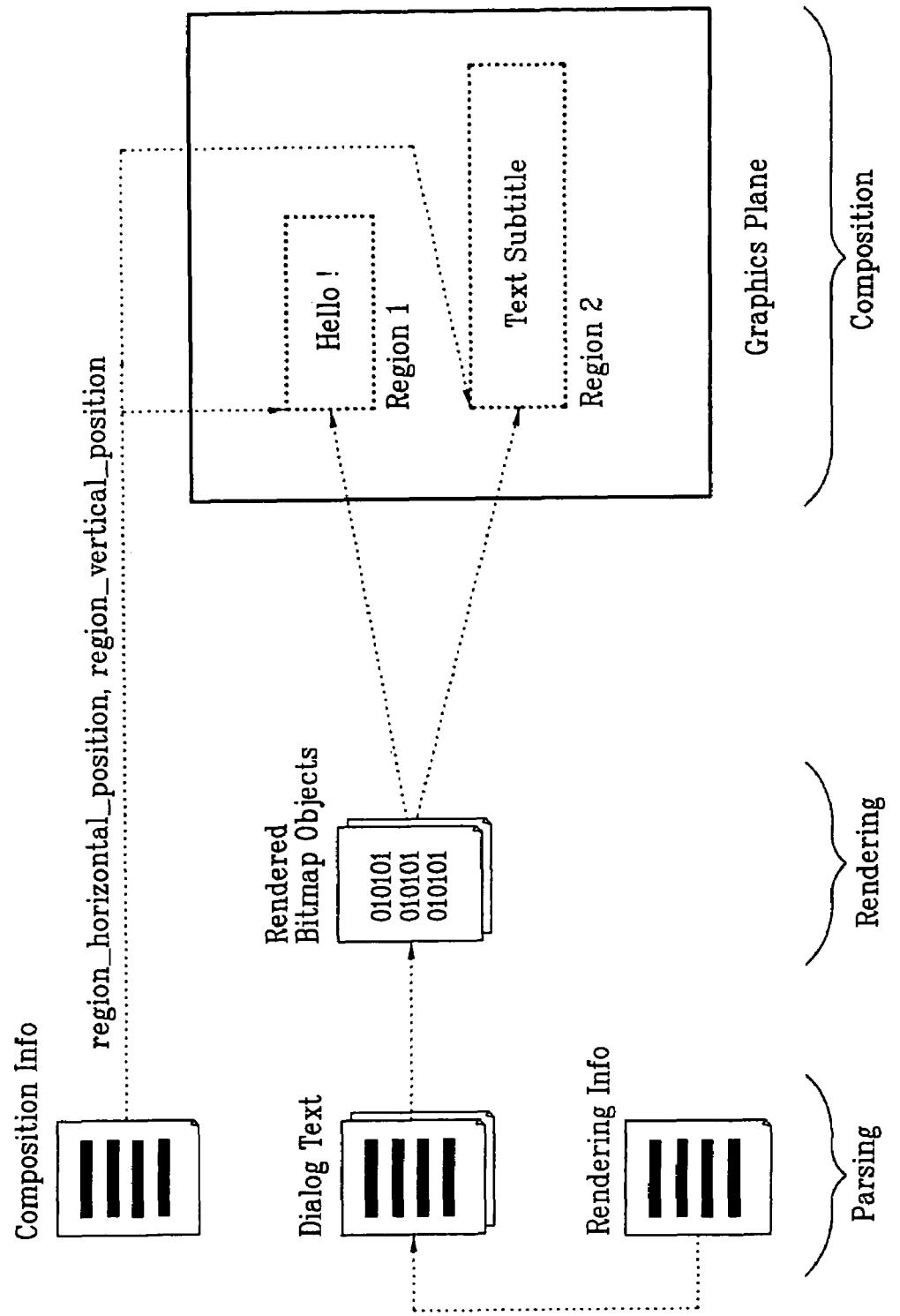
FIG. 10 illustrates a graphical representation illustrating parsing, rendering, and composition processes performing by a text subtitle decoder according to the present invention.

FIG. 10 is a simple graphical representation illustrating parsing, rendering, and composition processes performed by the text subtitle decoder 42 shown in FIG. 9. In the parsing process, a DSU is initially transferred to the DCB 425 and a DPU is parsed into composition information, dialog text data, and rendering information. Text strings for each dialog region included in the dialog text data are rendered into a bitmap object using the rendering information, and the bitmap object rendered for each region is composed within the GP 43 according to the composition information, which may include presentation information, palette information, and region position information.

Figure 11:
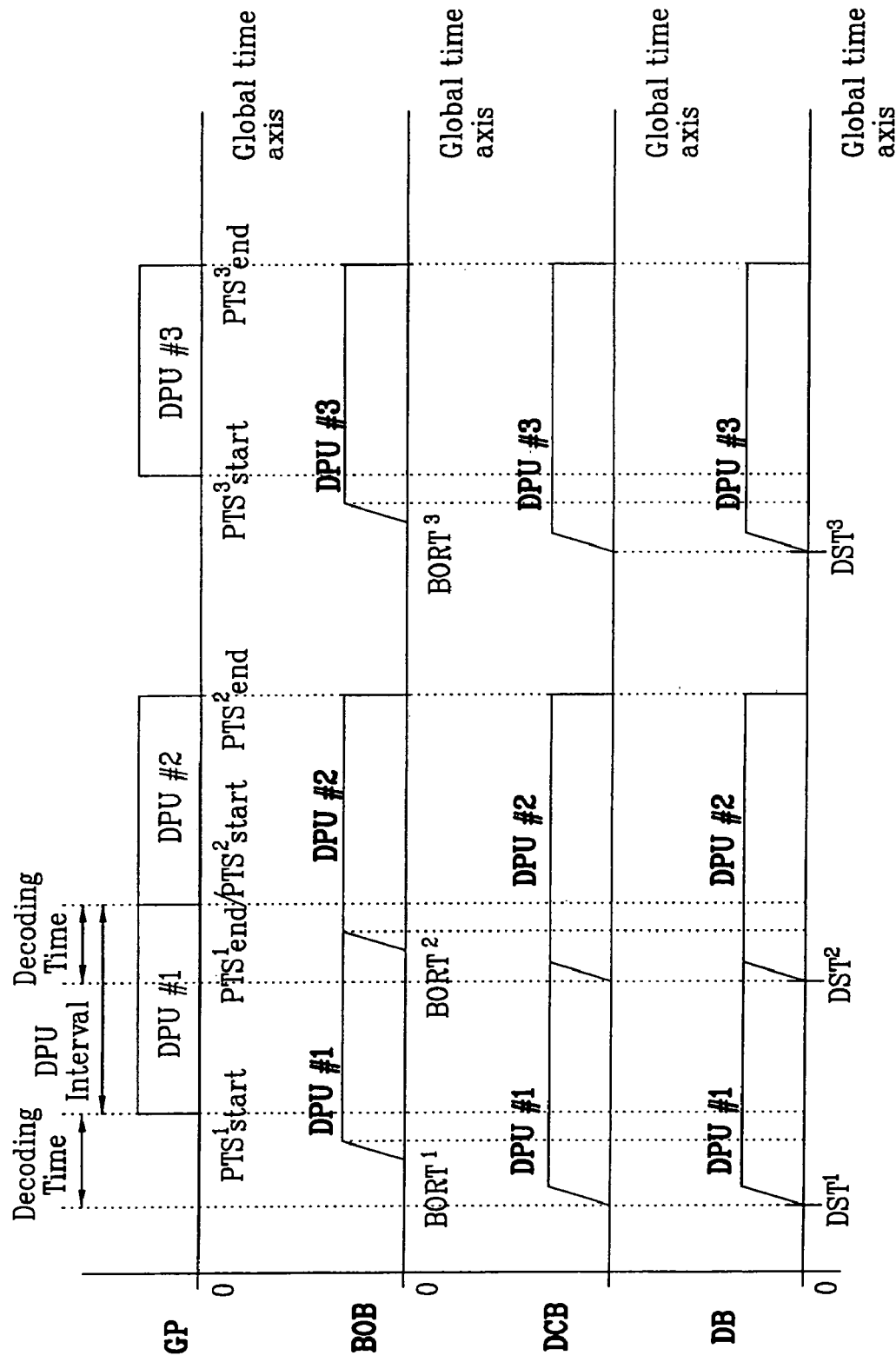
FIG. 11 illustrates operation times of various components included in a text subtitle decoder according to the present invention.

FIG. 11 illustrates operation times of the GP 43, BOB 424, DCB 425, and DB 422 in a global time axis perceived by a user. Referring to FIG. 11, a decoding start time (DST) represents a time at which the text subtitle decoder 42 starts to decode a text subtitle stream preloaded in the SPB 41. More particularly, a DST represents a time at which the DB 422 and the DCB 425 start storing dialog text data and composition and rendering information parsed by the text subtitle processor 421. A bitmap object ready time (BORT) represents a time at which the BOB 424 stores all the bitmap objects rendered by the text renderer 423 and is ready to output the bitmap objects. A presentation time stamp (PTS) represents a time at which all the bitmap objects are composed within the GP 43.

For example, when the text subtitle processor 421 starts parsing a DSU and DPU #1 into dialog text data, composition information, and rendering information, the DB 422 starts storing the dialog text data at $DST^1$. At the same time, DCB 425 starts storing the composition and rendering information. Thereafter, the text renderer 423 renders text strings included in the dialog text data into an bitmap object for each dialog region and the BOB 424 stores all the bitmap objects and is ready to output the stored objects at $BORT^1$. Next, all the bitmap objects are composed within the GP 43 between $PTS_{start}^1$ and $PTS_{end}^1$. Prior to $PTS_{end}^1$, the text subtitle processor 421 start parsing a DSU and DPU #2 into dialog text data, composition information, and rendering information, and all the steps described above for decoding DPU #1 are repeated again for decoding DPU #2, as shown in FIG. 11.

The dialog presentation period for a text subtitle dialog (e.g., between $PTS_{start}^1$ and $PTS_{end}^1$) may be limited (e.g., greater than or equal to one second) so as to avoid frequent changes of dialogs within a display screen. In addition, the bitmap objects stored in the BOB 424 may be deleted when all the bitmap objects are composed within the GP 43. However, when two consecutive DPUs are continuous as shown in FIG. 11, at least a portion of the bitmap objects stored in the BOB 424 for a previous DPU may be used when generating bitmap objects for a current DPU. However, the bitmap objects may be deleted from the BOB 424 when a discontinuity exists between two DPUs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

According to the present invention, the data structure of the data included in a text subtitle stream recorded on a recording medium is defined such that the text subtitle stream could be reproduced with main AV streams in a very efficient and standardized manner. Also, seamless presentation of a text subtitle supporting multi-languages is ensured by preloading all the necessary text subtitle streams and related font files in buffers, respectively.

What is claimed is:

1. A method for decoding a text subtitle stream recorded on a recording medium, the method comprising:

loading the text subtitle stream into a subtitle loading buffer, the text subtitle stream including a style segment defining region styles and one or more presentation segment, each presentation segment including presentation information and text data for at least one region;

parsing the text subtitle stream into composition information, rendering information, and the text data for each region;

storing the parsed composition and the rendering information in a first buffer, and further storing the parsed text data in a second buffer, the text data including one or more text strings for each region;

rendering the text strings stored in the second buffer into a bitmap object for each region according to the rendering information, and storing the rendered bitmap object into a third buffer; and composing the stored bitmap object in a graphics plane for each region according to the composition information.

2. The method of claim 1, further comprising storing the style segment in the first buffer immediately after the text subtitle stream is loaded.

3. The method of claim 1, wherein the rendering information includes at least one of a region size, font color, background color, text flow, text alignment, line space, font name, font style, and font size for each region.

4. The method of claim 1, wherein the rendering information includes at least a portion of region style information specifying one of the region styles defined by the style segment.

5. The method of claim 1, wherein the text data further includes a region style identifier which identifies one of the region styles defined by the style segment.

6. The method of claim 1, further comprising loading font data into a font loading buffer before the presentation segment is parsed, the font data being used when rendering the text strings stored in the second buffer.

7. The method of claim 1, wherein the composition information includes at least one of presentation time information, palette update information, and a region position for each region.

8. The method of claim 1, wherein the composition information includes the presentation information included in the presentation segment.

9. The method of claim 1, wherein the composition information includes at least a portion of region style information specifying one of the region styles defined by the style segment.

10. A method for decoding a text subtitle stream recorded on a recording medium, the method comprising:

preloading the text subtitle stream into a subtitle preloading buffer at once, the text subtitle stream including a style segment defining region styles and a presentation segment including presentation information and text data for at least one region, the text data including a region style identifier and one or more text strings for each region;

preloading related font data into a font preloading buffer at once;

storing the style segment in a composition buffer after the text subtitle stream is preloaded, the style segment including rendering information and composition information;

parsing the presentation segment into the composition information and the text data for each region;

storing the parsed composition information in the composition buffer for each region;

storing the parsed text data in a dialog buffer for each region;

rendering the text strings into a bitmap object for each region based on the rendering information and the preloaded font data;

storing the rendered bitmap object into a bitmap object buffer for each region; and composing the stored bitmap object within a graphics plane for each region according to the composition information.

11. The method of claim 10, further comprising storing the style segment in the composition buffer immediately after the text subtitle stream is loaded.

12. The method of claim 10, wherein the rendering information includes at least one of a region size, font color, background color, text flow, text alignment, line space, font name, font style, and font size for each region.

13. The method of claim 10, wherein the rendering information includes at least a portion of region style information specifying one of the region styles defined by the style segment.

14. The method of claim 10, further comprising loading font data into a font loading buffer before the presentation segment is parsed, the font data being used when rendering the text strings stored in the dialog buffer.

15. The method of claim 10, wherein the composition information includes at least one of presentation time information, palette update information, and a region position for each region.

16. The method of claim 10, wherein the composition information includes the presentation information included in the presentation segment.

17. The method of claim 10, wherein the composition information includes at least a portion of region style information specifying one of the region styles defined by the style segment.

18. A text subtitle decoder for decoding a text subtitle stream recorded on a recording medium, the text subtitle decoder comprising:

a text subtitle processor configured to parse the text subtitle stream into composition information, rendering information, and text data for each region;

a composition buffer configured to store the composition arid the rendering information parsed from the text subtitle processor;

a dialog buffer configured to store the parsed text data, the text data including one or more text strings for each region;

a text renderer configured to render the text strings stored in the dialog buffer into a bitmap object for each region according to the rendering information;

a bitmap object buffer configured to store the rendered bitmap object; and a presentation controller configured to compose the bitmap object stored in the bitmap object buffer according to the composition information.

19. The text subtitle decoder of claim 18, wherein the composition buffer is configure to store the style segment immediately after the text subtitle stream is loaded.

20. The text subtitle decoder of claim 18, wherein the text subtitle processor is configured to parse the text subtitle stream into rendering information including at least one of a region size, font color, background color, text flow, text alignment, line space, font name, font style, and font size for each region.

21. The text subtitle decoder of claim 18, wherein the text subtitle processor is configured to parse the text subtitle stream into rendering information including at least a portion of region style information specifying one of the region styles defined by the style segment.

22. The text subtitle decoder of claim 18, wherein the text subtitle processor is configured to parse the text subtitle stream into text data further including a region style identifier which identifies one of the region styles defined by the style segment.

23. The text subtitle decoder of claim 18, further comprising a font loading buffer configured to load font data before the presentation segment is parsed, wherein the text renderer uses the font data when rendering the text strings stored in the buffer.

24. The text subtitle decoder of claim 18, wherein the text subtitle processor is configured to parse the text subtitle stream into the composition information including at least one of presentation time information, palette update information, and a region position for each region.

25. The text subtitle decoder of claim 18, wherein the text subtitle processor is configured to parse the text subtitle stream into the composition information including the presentation information included in the presentation segment.

26. The text subtitle decoder of claim 18, wherein the text subtitle processor is configured to parse the text subtitle stream into the composition information including at least a portion of region style information specifying one of the region styles defined by the style segment.

27. The text subtitle decoder of claim 18, wherein the presentation controller is configured to control the dialog buffer, the text render and the bitmap object buffer.

28. The text subtitle decoder of claim 18, wherein the presentation controller is configured to provide the rendering information and the composition information.

29. A text subtitle decoder for decoding a text subtitle stream recorded on a recording medium, the text subtitle decoder comprising:

a subtitle preloading buffer configured to preload the text subtitle stream at once, the text subtitle stream including a style segment defining region styles and a presentation segment including presentation information and text data for at least one region, the text data including a region style identifier and one or more text strings for each region;

a font preloading buffer configured to preload related font data at once;

a composition buffer configured to store the style segment after the text subtitle stream is preloaded, the style segment including rendering information and composition information;

a text subtitle processor configured to parse the presentation information into the composition information and the text data for each region, the parsed composition information being stored in the composition buffer for each region;

a buffer configured to store the parsed text data for each region;

a text renderer configured to render the text strings into a bitmap object for each region based on the rendering information and the preloaded font data;

a bitmap object buffer configured to store the rendered bitmap object for each region;

a graphics plane in which the bitmap object stored in the bitmap object buffer for each region is composed according to the composition information; and a presentation controller configured to provide the rendering information and the composition information to the text renderer and the graphics plane, respectively.

30. The text subtitle decoder of claim 29, wherein the composition buffer is configured to store the style segment immediately after the text subtitle stream is loaded.

31. The text subtitle decoder of claim 29, wherein the text subtitle processor is configured to parse the text subtitle stream into the rendering information including at least one of a region size, font color, background color, text flow, text alignment, line space, font name, font style, and font size for each region.

32. The text subtitle decoder of claim 29, wherein the text subtitle processor is configured to parse the text subtitle stream into the rendering information including at least a portion of region style information specifying one of the region styles defined by the style segment.

33. The text subtitle decoder of claim 29, configured to further comprise a font loading buffer configured to load font data before the presentation segment is parsed, wherein the text renderer uses the font data when rendering the text strings stored in the buffer.

34. The text subtitle decoder of claim 29, wherein the text subtitle processor is configured to parse the text subtitle stream into the composition information including at least one of presentation time information, palette update information, and a region position for each region.

35. The text subtitle decoder of claim 29, wherein the text subtitle processor is configured to parse the text subtitle stream into the composition information including the presentation information included in the presentation segment.

36. The text subtitle decoder of claim 29, wherein the text subtitle processor is configured to parse the text subtitle stream into the composition information including at least a portion of region style information specifying one of the region styles defined by the style segment.

37. An optical disc player for reproducing text subtitle streams recorded on an optical disc, the optical disc player comprising:

an audio decoder configured to decode audio streams recorded on the optical disc into audio data;

a video decoder configured to decode video streams recorded on the optical disc into video image data;

a text subtitle decoder configured to decode a text subtitle stream recorded on the optical disc into text subtitle image data; and an image superimposition unit configured to superimpose the decoded text subtitle image data with the decoded video image data, wherein the text subtitle decoder comprises:

a text subtitle processor configured to parse the text subtitle stream into composition information, rendering information, and text data for at least one region, the text data including one or more text strings for each region;

a text renderer configured to render the text strings into graphic data for each region according to the rendering information; and a presentation controller configured to compose the rendered graphic data according to the composition information.

38. The optical disc player of claim 37, wherein the text subtitle processor is configured to parse the text subtitle stream into the rendering information including at least one of a region size, font color, background color, text flow, text alignment, line space, font name, font style, and font size for each region.

39. The optical disc player of claim 37, wherein the text subtitle processor is configured to parse the text subtitle stream into the rendering information including at least a portion of region style information specifying one of the region styles defined by the style segment.

40. The optical disc player of claim 37, wherein the text subtitle processor is configured to parse the text subtitle stream into the text data further including a region style identifier which identifies one of the region styles defined by the style segment.

41. The optical disc player of claim 37, further comprising a font loading buffer configured to load font data before the presentation segment is parsed, wherein the text renderer uses the font data when rendering the text strings stored in the buffer.

42. The optical disc player of claim 37, wherein the text subtitle processor is configured to parse the text subtitle stream into the composition information including at least one of presentation time information, palette update information, and a region position for each region.

43. The optical disc player of claim 37, wherein the text subtitle processor is configured to parse the text subtitle stream into the composition information including the presentation information included in the presentation segment.

44. The optical disc player of claim 37, wherein the text subtitle processor is configured to parse the text subtitle stream into the composition information including at least a portion of region style information specifying one of the region styles defined by the style segment.

45. The optical disc player of claim 37, wherein the optical disc player is configured to further comprise a subtitle loading buffer loading the text subtitle stream, the text subtitle stream including a style segment defining region styles and a presentation segment including presentation information and text data having at least one region.

46. The optical disc player of claim 37, wherein the presentation controller is configured to control the text render.

47. The optical disc player of claim 37, wherein the presentation controller is configured to provide the rendering information and the composition information.

48. A method for decoding a text subtitle stream downloaded from an external source, the method comprising:

loading the text subtitle stream into a subtitle loading buffer, the text subtitle stream including a style segment defining region styles and one or more presentation segments, each presentation segment including presentation information and text data for at least one region;

parsing the text subtitle stream into composition information, rendering information, and the text data for each region;

storing the parsed composition and rendering information in a first buffer, and further storing the text data in a second buffer, the text data including one or more text strings for each region;

rendering the text strings stored in the second buffer into a bitmap object for each region according to the rendering information, and storing the rendered bitmap object into a third buffer; and composing the stored bitmap object in a graphics plane for each region according to the composition information.

49. The method of claim 48, further comprising storing the style segment in the first buffer immediately after the text subtitle stream is loaded.

50. The method of claim 48, wherein the rendering information includes at least one of a region size, font color, background color, text flow, text alignment, line space, font name, font style, and font size for each region.

51. The method of claim 48, wherein the rendering information includes at least a portion of region style information specifying one of the region styles defined by the style segment.

52. The method of claim 48, wherein the text data further includes a region style identifier which identifies one of the region styles defined by the style segment.

53. The method of claim 48, further comprising loading font data into a font loading buffer before the presentation segment is parsed, the font data being used when rendering the text strings stored in the second buffer.

54. The method of claim 48, wherein the composition information includes at least one of presentation time information, palette update information, and a region position for each region.

55. The method of claim 48, wherein the composition information includes the presentation information included in the presentation segment.

56. The method of claim 48, wherein the composition information includes at least a portion of region style information specifying one of the region styles defined by the style segment.

57. A method for decoding a text subtitle stream downloaded from an external source, the method comprising:
  preloading the text subtitle stream into a subtitle preloading buffer at once, the text subtitle stream including a style segment defining region styles and a presentation segment including presentation information and text data for at least one region, the text data including a region style identifier and one or more text strings for each region;
  preloading related font data into a font preloading buffer at once; storing the style segment in a composition buffer after the text subtitle stream is preloaded, the style segment including rendering information and composition information;
  parsing the presentation segment into the composition information and the text data for each region;
  storing the parsed composition information in the composition buffer for each region;
  storing the parsed text data in a dialog buffer for each region;
  rendering the text strings into a bitmap object for each region based on the rendering information and the preloaded font data;
  storing the rendered bitmap object into a bitmap object buffer for each region; and
  composing the stored bitmap object within a graphics plane for each region according to the composition information.

58. The method of claim 57, further comprising storing the style segment in the composition buffer immediately after the text subtitle stream is loaded.

59. The method of claim 57, wherein the rendering information includes at least one of a region size, font color, background color, text flow, text alignment, line space, font name, font style, and font size for each region.

60. The method of claim 57, wherein the rendering information includes at least a portion of region style information specifying one of the region styles defined by the style segment.

61. The method of claim 57, wherein the text data further includes a region style identifier which identifies one of the region styles defined by the style segment.

62. The method of claim 57, further comprising loading font data into a font loading buffer before the presentation segment is parsed, the font data being used when rendering the text strings stored in the dialog buffer.

63. The method of claim 57, wherein the composition information includes at least one of presentation time information, palette update information, and a region position for each region.

64. The method of claim 57, wherein the composition information includes the presentation information included in the presentation segment.

65. The method of claim 57, wherein the composition information includes at least a portion of region style information specifying one of the region styles defined by the style segment.

66. A text subtitle decoder for decoding a text subtitle stream downloaded from the external source, the text subtitle decoder comprising:
  a subtitle preloading buffer configured to preload the text subtitle stream at once, the text subtitle stream including a style segment defining region styles and a presentation segment including presentation information and text data for at least one region, the text data including a region style identifier and one or more text strings for each region;
  a font preloading buffer configured to preload related font data at once;
  a composition buffer configured to store the style segment after the text subtitle stream is preloaded, the style segment including rendering information and composition information;
  a text subtitle processor configured to parse the presentation information into the composition information and the text data for each region, the parsed composition information being stored in the composition buffer for each region;
  a buffer configured to store the parsed text data for each region;
  a text renderer configured to render the text strings into a bitmap object for each region based on the rendering information and the preloaded font data;
  a bitmap object buffer configured to store the rendered bitmap object for each region;
  a graphics plane in which the bitmap object stored in the bitmap object buffer for each region is composed according to the composition information; and
  a presentation controller configured to provide the rendering information and the composition information to the text renderer and the graphics plane, respectively.

67. The text subtitle decoder of claim 66, wherein the composition buffer is configured to store the style segment immediately after the text subtitle stream is loaded.

68. The text subtitle decoder of claim 66, wherein the text subtitle processor is configured to parse the text subtitle stream into the rendering information including at least one of a region size, font color, background color, text flow, text alignment, line space, font name, font style, and font size for each region.

69. The text subtitle decoder of claim 66, wherein the text subtitle processor is configured to parse the text subtitle stream into the rendering information including at least a portion of region style information specifying one of the region styles defined by the style segment.

70. The text subtitle decoder of claim 66, further comprising a font loading buffer configured to load font data before the presentation segment is parsed, wherein the text renderer uses the font data when rendering the text strings stored in the buffer.

71. The text subtitle decoder of claim 66, wherein the text subtitle processor is configured to parse the text subtitle stream into the composition information including at least one of presentation time information, palette update information, and a region position for each region.

72. The text subtitle decoder of claim 66, wherein the text subtitle processor is configured to parse the text subtitle stream into the composition information including the presentation information included in the presentation segment.

73. The text subtitle decoder of claim 66, wherein the text subtitle processor is configured to parse the text subtitle stream into the composition information including at least a portion of region style information specifying one of the region styles defined by the style segment.

74. An optical disc player for reproducing text subtitle streams downloaded from an external source, the optical disc player comprising:
- an audio decoder configured to decode audio streams recorded on the optical disc into audio data;
- a video decoder configured to decode video streams recorded on the optical disc into video image data;
- a text subtitle decoder configured to decode a text subtitle stream recorded on the optical disc into text subtitle image data; and
- an image superimposition unit configured to superimpose the decoded text subtitle image data with the decoded video image data, wherein the text subtitle decoder comprises:
  - a text subtitle processor configured to parse the text subtitle stream into composition information, rendering information, and text data for at least one region, the text data including one or more text strings for each region;
  - a text renderer configured to render the text strings into graphic data for each region according to the rendering information; and
  - a presentation controller configured to compose the rendered graphic data according to the composition information.

75. The optical disc player of claim 74, wherein the text subtitle processor is configured to parse the text subtitle stream into the rendering information including at least one of a region size, font color, background color, text flow, text alignment, line space, font name, font style, and font size for each region.

76. The optical disc player of claim 74, wherein the text subtitle processor is configured to parse the text subtitle stream into the rendering information including at least a portion of region style information specifying one style defined by a style segment.

77. The optical disc player of claim 74, wherein the text subtitle processor is configured to parse the text subtitle stream into the text data further including a region style identifier which identifies one region style defined by a style segment.

78. The optical disc player of claim 74, further comprising a font loading buffer configured to load font data before the presentation segment is parsed, wherein the text renderer uses the font data when rendering the text strings stored in the buffer.

79. The optical disc player of claim 74, wherein the text subtitle processor is configured to parse the text subtitle stream into the composition information including at least one of presentation time information, palette update information, and a region position for each region.

80. The optical disc player of claim 74, wherein the text subtitle processor is configured to parse the text subtitle stream into the composition information including the presentation information included in the presentation segment.

81. The optical disc player of claim 74, wherein the text subtitle processor is configured to parse the text subtitle stream into the composition information including at least a portion of region style information specifying one region style defined by a style segment.

82. The optical disc player of claim 74, wherein the optical disc player is configured to further comprise a subtitle loading buffer loading the text subtitle stream, the text subtitle stream including a style segment defining region styles and a presentation segment including presentation information and text data having at least one region.

83. The optical disc player of claim 74, wherein the presentation controller is configured to control the text render.

84. The optical disc player of claim 74, wherein the presentation controller is configured to provide the rendering information and the composition information.

* * * * *

UNITED STATES PATENT AND TRADEMARK OFFICE
CERTIFICATE OF CORRECTION

PATENT NO. : 7,561,780 B2  Page 1 of 1
APPLICATION NO. : 11/013379
DATED : July 14, 2009
INVENTOR(S) : Kang Soo Seo et al.

It is certified that error appears in the above-identified patent and that said Letters Patent is hereby corrected as shown below:

Column 13, line 55, please change "arid" to "and".

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,561,780 B2 | |
| APPLICATION NO. | : 11/013379 | |
| DATED | : July 14, 2009 | |
| INVENTOR(S) | : Kang Soo Seo et al. | |

It is certified that error appears in the above-identified patent and that said Letters Patent is hereby corrected as shown below:

In claim 29 at column 14, lines 61-62, please change "presentation information" to "presentation segment".

In claim 66 at column 18, lines 29-40, please change "presentation information" to "presentation segment".

Signed and Sealed this
Twelfth Day of April, 2011

David J. Kappos
*Director of the United States Patent and Trademark Office*